(12) United States Patent
Ingle

(10) Patent No.: US 8,234,014 B1
(45) Date of Patent: Jul. 31, 2012

(54) IRRIGATION CONTROL SYSTEM AND METHOD

(75) Inventor: Edwin C. Ingle, Jamestown, NC (US)

(73) Assignee: Eco-Precise Irrigation Controls, LLC, Jamestown, NC (US)

( * ) Notice: Subject to any disclaimer, the term of this patent is extended or adjusted under 35 U.S.C. 154(b) by 302 days.

(21) Appl. No.: 12/590,055

(22) Filed: Nov. 2, 2009

(51) Int. Cl.
*G05D 11/00* (2006.01)
*G06F 3/041* (2006.01)

(52) U.S. Cl. ............ 700/284; 700/15; 700/17; 715/961; 345/173

(58) Field of Classification Search ................ 700/15, 700/17, 284; 345/173, 179–183; 715/700, 715/961, 965
See application file for complete search history.

(56) References Cited

U.S. PATENT DOCUMENTS

| | | | |
|---|---|---|---|
| 5,272,620 A | 12/1993 | Mock et al. ................... 364/145 |
| 5,381,331 A | 1/1995 | Mock et al. ................... 364/145 |
| 5,444,611 A | 8/1995 | Woytowitz et al. ............ 364/145 |
| 6,088,621 A | 7/2000 | Woytowitz et al. ............. 700/16 |
| 6,453,215 B1 | 9/2002 | Lavoie .......................... 700/284 |
| 6,459,959 B1 | 10/2002 | Williams et al. .............. 700/284 |
| 6,694,195 B1 | 2/2004 | Garcia ............................ 700/26 |
| 6,721,630 B1 | 4/2004 | Woytowitz .................... 700/284 |
| 6,772,050 B2 | 8/2004 | Williams et al. .............. 700/284 |
| 6,996,457 B2 | 2/2006 | Williams et al. .............. 700/284 |
| 7,010,394 B1 | 3/2006 | Runge et al. .................. 700/284 |
| 7,010,395 B1 | 3/2006 | Goldberg et al. ............. 700/284 |
| 7,058,479 B2 | 6/2006 | Miller .......................... 700/284 |
| 7,069,115 B1 | 6/2006 | Woytowitz .................... 700/284 |
| 7,133,749 B2 | 11/2006 | Goldberg et al. ............. 700/284 |
| 7,203,576 B1 * | 4/2007 | Wilson et al. ................. 700/284 |
| 7,225,057 B2 | 5/2007 | Froman et al. ................ 700/284 |
| 7,245,991 B1 | 7/2007 | Woytowitz .................... 700/284 |
| 7,248,945 B2 | 7/2007 | Woytowitz .................... 700/284 |
| 7,257,465 B2 | 8/2007 | Perez et al. ................... 700/284 |
| 7,289,886 B1 | 10/2007 | Woytowitz .................... 700/284 |
| 7,328,089 B2 | 2/2008 | Curren ......................... 700/284 |
| 7,359,769 B2 | 4/2008 | Bailey et al. .................. 700/284 |
| 7,363,113 B2 | 4/2008 | Runge et al. .................. 700/284 |
| 7,398,139 B1 | 7/2008 | Woytowitz .................... 700/284 |
| 7,412,303 B1 | 8/2008 | Porter et al. .................. 700/284 |
| 7,444,207 B2 | 10/2008 | Nickerson et al. ............ 700/284 |
| 7,953,517 B1 * | 5/2011 | Porter et al. .................. 700/284 |
| 2008/0003114 A1 * | 1/2008 | Levin et al. ................... 417/306 |
| 2010/0030476 A1 * | 2/2010 | Woytowitz et al. ............... 702/3 |

* cited by examiner

*Primary Examiner* — Sean Shechtman
(74) *Attorney, Agent, or Firm* — Walter L. Beavers; Blake P. Hurt

(57) ABSTRACT

An irrigation control system with a programmable controller having a high speed central processor and a touch screen monitor for independent and simultaneous operation of multiple watering stations and schedules. The touch screen monitor allows for quick entry of changes to irrigation schedules that can be made while the system is in use, thus preventing service interruption. The irrigation control system will accommodate multiple watering stations with precise accuracy and allows for independent start times for each station. Multiple output terminals permit connection to various watering stations as a pre-programmed, removable thumb drive containing the operating system and application software is connected through a USB port to a high speed central processor. The irrigation method describes using the controller for optimum plant growth and health.

6 Claims, 22 Drawing Sheets
(13 of 22 Drawing Sheet(s) Filed in Color)

System Screen A

Status Screen B

Station Schedule Screen C

Input Screen D

System Screen (Second Option) E

Clock Set Screen F

Set Date Screen G

Set Start of Day Screen H

Set Pump Screen I

Pump Link Screen J

Keyboard Screen K

Input Programming Screen L

Remote Setup Screen M

Program Selection Screen N

Program Definition Screen O

Start Time Screen P

Independent Start Time Screen Q

Time Input Screen R

Interval Input Screen S

Run Time Screen T

1 Cycle Screen U

Settings Report Screen V

Schedule Screen W

Scaling % Screen X

Suspend Program Screen Y

Suspend Screen Z

Manual Operations Screen AAA

IRRIGATION CONTROL SYSTEM AND METHOD

COPYRIGHT NOTIFICATION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

COMPUTER PROGRAM LISTING APPENDIX

In compliance with 37 C.F.R. §1.52(e), a computer program listing appendix incorporating features of the present invention is submitted herewith on compact disc and is incorporated by reference in its entirety herein. The computer program listing appendix is submitted on a first compact disc labeled "Copy 1" and on a second compact disc labeled "Copy 2". Each disc was created 21 Oct. 2009 in an IBM-PC machine format and Linux operating system compatibility with the disc labeled Copy 2 being an identical copy of the disc labeled Copy 1. Each compact disc contains a single file folder entitled "Irrigation Control System and Method" which is the source code of a computer program that may be used with the present invention. The Irrigation Control System and Method file folder having a size of 642,222,080 bytes was created on 21 Oct. 2009.

The Irrigation Control System And Method File Folder contains five (5) folders and one (1) document as follows:
1) HARDWARE;
2) HELP FILES;
3) SCRIPT FILES;
4) THUMBDRIVE;
5) VISUAL BASIC; and

| Name | Size | File Type | Date |
|---|---|---|---|
| Read_me.doc | 22 KB | MS Office Word 97-2003 document | Oct. 7, 2009 |

The contents of the five (5) folders are detailed below as follows:

| 1) HARDWARE - File Folder ||||
|---|---|---|---|
| Name | Size | File Type | Date |
| a) Module Firmware - File Folder ||||
| e2.asm | 6 KB | ASM File | May 13, 2008 |
| e.asm | 12 KB | ASM File | Dec. 18, 2008 |
| eA2D.asm | 3 KB | ASM File | Jun. 24, 2008 |
| edelay.asm | 4 KB | ASM File | Mar. 24, 2008 |
| eEEwrite.asm | 3 KB | ASM File | Jun. 18, 2008 |
| EI2C.ASM | 6 KB | ASM File | Aug. 20, 2008 |
| EI2Cnew.ASM | 5 KB | ASM File | May 20, 2008 |
| EI2Cold.ASM | 6 KB | ASM File | May 20, 2008 |
| eint.asm | 1 KB | ASM File | Jun. 11, 2009 |
| emath.asm | 7 KB | ASM File | Aug. 29, 2007 |
| eregs.asm | 3 KB | ASM File | Jun. 18, 2008 |
| main.c | 6 KB | C File | Jul. 2, 2008 |
| b) Motherboard Firmware - File Folder ||||
| io_cfg.h | 2 KB | H File | Jun. 17, 2008 |
| main.c | 4 KB | C File | Aug. 13, 2008 |
| remote.c | 6 KB | C File | Aug. 9, 2008 |

| 1) HARDWARE - File Folder ||||
|---|---|---|---|
| Name | Size | File Type | Date |
| remote.h | 6 KB | H File | Aug. 17, 2008 |
| stdio.h | 1 KB | H File | Oct. 1, 2004 |
| typedefs.h | 5 KB | H File | Jul. 12, 2004 |
| user.c | 11 KB | C File | Aug. 25, 2008 |
| user.h | 1 KB | H File | Aug. 13, 2008 |
| c) Schematics - File Folder ||||
| module.pdf | 434 KB | Adobe Acrobat Doc. | Oct. 6, 2009 |
| motherboard.pdf | 695 KB | Adobe Acrobat Doc. | Oct. 6, 2009 |

| 2) HELP FILES - File Folder ||||
|---|---|---|---|
| Name | Size | File Type | Date |
| clock_help.rtf | 4 KB | RTF*** | Sep. 21, 2008 |
| date_help.rtf | 4 KB | RTF*** | Nov. 16, 2008 |
| endofday_help.rtf | 4 KB | RTF*** | Nov. 16, 2008 |
| inputprogs_help0.rtf | 4 KB | RTF*** | Nov. 16, 2008 |
| inputprogs_help1.rtf | 4 KB | RTF*** | Nov. 16, 2008 |
| inputs_help.rtf | 5 KB | RTF*** | Nov. 16, 2008 |
| main_help0.rtf | 38 KB | RTF*** | Nov. 15, 2008 |
| main_help1.rtf | 4 KB | RTF*** | Nov. 15, 2008 |
| main_help2.rtf | 4 KB | RTF*** | Nov. 15, 2008 |
| main_help3.rtf | 4 KB | RTF*** | Nov. 15, 2008 |
| manual_help.rtf | 5 KB | RTF*** | Nov. 24, 2008 |
| opts1_help.rtf | 4 KB | RTF*** | Nov. 24, 2008 |
| opts2_help.rtf | 4 KB | RTF*** | Nov. 16, 2008 |
| override_help.rtf | 3 KB | RTF*** | Nov. 16, 2008 |
| prog_help.rtf | 4 KB | RTF*** | Nov. 16, 2008 |
| progs_help.rtf | 4 KB | RTF*** | Nov. 16, 2008 |
| pump_help.rtf | 4 KB | RTF*** | Nov. 16, 2008 |
| remote_help.rtf | 4 KB | RTF*** | Nov. 16, 2008 |
| ride_help.rtf | 4 KB | RTF*** | Nov. 16, 2008 |
| runtime_help.rtf | 5 KB | RTF*** | Nov. 16, 2008 |
| schedule_help.rtf | 5 KB | RTF*** | Nov. 16, 2008 |
| startofday_help.rtf | 4 KB | RTF*** | Sep. 21, 2008 |
| starts2_help.rtf | 4 KB | RTF*** | Nov. 16, 2008 |
| starts_help.rtf | 4 KB | RTF*** | Nov. 16, 2008 |
| stations_help.rtf | 5 KB | RTF*** | Sep. 26, 2008 |
| test_help.rtf | 4 KB | RTF*** | Sep. 21, 2008 |

| 3) SCRIPT FILES - File Folder ||||
|---|---|---|---|
| Name | Size | File Type | Date |
| epic_backup | 5 KB | File | Apr. 13, 2009 |
| epic_compiler | 1 KB | File | Apr. 11, 2009 |
| epic_init | 1 KB | File | May 4, 2009 |
| epic_restore | 4 KB | File | Apr. 11, 2009 |
| epic_sync | 1 KB | File | Apr. 30, 2009 |

| Name | Size | File Type | Date |
|---|---|---|---|
| 4) THUMBDRIVE - File Folder ||||
| epic | | File Folder | Oct. 6, 2009 |
| initrd.gz | 1,260 KB | GZ File | Feb. 9, 2009 |
| pup_412.sfs | 93,400 KB | SFS File | Feb. 9, 2009 |
| pup_save.2fs | 524,288 KB | 2FS File | Feb. 9, 2009 |
| syslinux.cfg | 1 KB | CFG File | Feb. 9, 2009 |
| vmlinuz | 1,590 KB | File | Feb. 9, 2009 |

-continued

Thumb Drive: Epic - File Folder

| Name | Size | File Type | Date |
|---|---|---|---|
| clock_help.rtf | 4 KB | RTF*** | Sep. 21, 2008 |
| date_help.rtf | 33 KB | RTF*** | Apr. 13, 2009 |
| endofday_help.rtf | 4 KB | RTF*** | Nov. 16, 2008 |
| epic_backup | 5 KB | File | Apr. 13, 2009 |
| epic_compiler | 1 KB | File | Apr. 11, 2009 |
| epic_init | 1 KB | File | May 4, 2009 |
| epic_restore | 4 KB | File | Apr. 11, 2009 |
| epic_sync | 1 KB | File | May 4, 2009 |
| inputprogs_help0.rtf | 33 KB | RTF*** | Apr. 13, 2009 |
| inputprogs_help1.rtf | 32 KB | RTF*** | Apr. 13, 2009 |
| inputs_help.rtf | 35 KB | RTF*** | Apr. 13, 2009 |
| liststations_help.rtf | 32 KB | RTF*** | Apr. 14, 2009 |
| main_help0.rtf | 38 KB | RTF*** | Nov. 15, 2008 |
| main_help1.rtf | 4 KB | RTF*** | Nov. 15, 2008 |
| main_help2.rtf | 36 KB | RTF*** | Apr. 13, 2009 |
| main_help3.rtf | 35 KB | RTF*** | Apr. 13, 2009 |
| manual_help.rtf | 5 KB | RTF*** | Apr. 11, 2009 |
| opts1_help.rtf | 34 KB | RTF*** | Apr. 13, 2009 |
| opts2_help.rtf | 4 KB | RTF*** | Nov. 16, 2008 |
| override_help.rtf | 3 KB | RTF*** | Nov. 16, 2008 |
| prog_help.rtf | 33 KB | RTF*** | Apr. 13, 2009 |
| progs_help.rtf | 4 KB | RTF*** | Nov. 16, 2008 |
| pump_help.rtf | 4 KB | RTF*** | Nov. 16, 2008 |
| remote_help.rtf | 4 KB | RTF*** | Nov. 16, 2008 |
| ride_help.rtf | 4 KB | RTF*** | Nov. 16, 2008 |
| runtime_help.rtf | 5 KB | RTF*** | Nov. 16, 2008 |
| scaler_help.rtf | 34 KB | RTF*** | Apr. 14, 2009 |
| schedule_help.rtf | 5 KB | RTF*** | Nov. 16, 2008 |
| startofday_help.rtf | 4 KB | RTF*** | Sep. 21, 2008 |
| starts2_help.rtf | 4 KB | RTF*** | Nov. 16, 2008 |
| starts_help.rtf | 4 KB | RTF*** | Nov. 16, 2008 |
| stations_help.rtf | 35 KB | RTF*** | Apr. 13, 2009 |
| suspend_help.rtf | 35 KB | RTF*** | Apr. 14, 2009 |
| test_help.rtf | 4 KB | RTF*** | Sep. 21, 2008 |
| water.exe | 848 KB | Application | May 3, 2009 |
| water.mdb | 1,118 KB | MS Office** | Apr. 3, 2009 |

5) VISUAL BASIC - File Folder

| Name | Size | File Type | Date |
|---|---|---|---|
| backups.frm | 20 KB | Corel* | Mar. 14, 2009 |
| backups.frx | 9 KB | FRX file | Mar. 14, 2009 |
| blank.frm | 17 KB | Corel* | May 3, 2009 |
| blank.frx | 3 KB | FRX file | May 3, 2009 |
| calendar.frm | 13 KB | Corel* | May 3, 2009 |
| calendar.frx | 9 KB | FRX file | May 3, 2009 |
| clockset.frm | 21 KB | Corel* | May 3, 2009 |
| clockset.frx | 14 KB | FRX file | May 3, 2009 |
| copyprogs.frm | 54 KB | Corel* | Feb. 2, 2009 |
| copyprogs.frx | 7 KB | FRX file | Feb. 2, 2009 |
| graph.frm | 35 KB | Corel* | Mar. 6, 2009 |
| helpwindow.frm | 6 KB | Corel* | Apr. 11, 2009 |
| helpwindow.frx | 1 KB | FRX file | Apr. 11, 2009 |
| inputprogs.frm | 54 KB | Corel* | Apr. 11, 2009 |
| inputprogs.frx | 7 KB | FRX file | Apr. 11, 2009 |
| inputs.frm | 21 KB | Corel* | Apr. 1, 2009 |
| inputs.frx | 7 KB | FRX file | Apr. 1, 2009 |
| keyboard.frm | 74 KB | Corel* | Mar. 14, 2009 |
| keyboard.frx | 4 KB | FRX file | Mar. 14, 2009 |
| keypad.frm | 20 KB | Corel* | Feb. 26, 2009 |
| keypad.frx | 1 KB | FRX file | Feb. 26, 2009 |
| liststations.frm | 40 KB | Corel* | Feb. 2, 2009 |
| liststations.frx | 7 KB | FRX file | Feb. 2, 2009 |
| mainscr.frm | 13 KB | Corel* | May 8, 2008 |
| mainscr.frx | 3 KB | FRX file | Dec. 28, 2007 |
| manual.frm | 85 KB | Corel* | Feb. 26, 2009 |
| manual.frx | 7 KB | FRX file | Feb. 26, 2009 |
| opts2.frm | 20 KB | Corel* | Apr. 30, 2009 |
| opts2.frx | 9 KB | FRX file | Apr. 30, 2009 |
| opts3.frm | 39 KB | Corel* | May 3, 2009 |
| opts3.frx | 9 KB | FRX file | May 3, 2009 |
| opts.frm | 18 KB | Corel* | Feb. 2, 2009 |
| opts.frx | 9 KB | FRX file | Feb. 2, 2009 |
| override.frm | 11 KB | Corel* | Feb. 2, 2009 |
| override.frx | 7 KB | FRX file | Feb. 2, 2009 |
| prog.frm | 17 KB | Corel* | Feb. 2, 2009 |
| prog.frx | 7 KB | FRX file | Feb. 2, 2009 |
| progs.frm | 21 KB | Corel* | Feb. 28, 2009 |
| progs.frx | 13 KB | FRX file | Feb. 28, 2009 |
| pump.frm | 43 KB | Corel* | Feb. 2, 2009 |
| pump.frx | 7 KB | FRX file | Feb. 2, 2009 |
| remote.frm | 14 KB | Corel* | Feb. 2, 2009 |
| remote.frx | 7 KB | FRX file | Feb. 2, 2009 |
| runtime.frm | 82 KB | Corel* | Feb. 6, 2009 |
| runtime.frx | 7 KB | FRX file | Feb. 6, 2009 |
| scaler.frm | 12 KB | Corel* | Feb. 2, 2009 |
| scaler.frx | 7 KB | FRX file | Feb. 2, 2009 |
| schedule.frm | 54 KB | Corel* | Apr. 11, 2009 |
| schedule.frx | 7 KB | FRX file | Apr. 11, 2009 |
| settings.frm | 111 KB | Corel* | Mar. 19, 2009 |
| settings.frx | 7 KB | FRX file | Oct. 20, 2008 |
| startofday.frm | 28 KB | Corel* | Mar. 30, 2009 |
| startofday.frx | 7 KB | FRX file | Mar. 30, 2009 |
| starts2.frm | 26 KB | Corel* | Feb. 2, 2009 |
| starts2.frx | 7 KB | FRX file | Feb. 2, 2009 |
| starts4.frm | 13 KB | Corel* | Feb. 2, 2009 |
| starts4.frx | 7 KB | FRX file | Feb. 2, 2009 |
| starts.frm | 21 KB | Corel* | Feb. 2, 2009 |
| starts.frx | 7 KB | FRX file | Feb. 2, 2009 |
| stationlist.frm | 33 KB | Corel* | Feb. 2, 2009 |
| stations.frm | 48 KB | Corel* | Feb. 2, 2009 |
| stations.frx | 7 KB | FRX file | Feb. 2, 2009 |
| suspend.frm | 16 KB | Corel* | Feb. 2, 2009 |
| suspend.frx | 7 KB | FRX file | Feb. 2, 2009 |
| test.frm | 49 KB | Corel* | Feb. 6, 2009 |
| test.frx | 7 KB | FRX file | Feb. 6, 2009 |
| verify.frm | 9 KB | Corel* | Apr. 2, 2009 |
| water1.BAS | 50 KB | BAS file | May 3, 2009 |
| water.mdb | 1,118 KB | MS Office** | Apr. 20, 2009 |
| water.vbp | 3 KB | VBP File | May 3, 2009 |
| water.vbw | 2 KB | VBW File | May 5, 2009 |

*Corel WordPerfect 8 document
**Microsoft Office Access Database
***Rich Text Format

FIELD OF THE INVENTION

The invention herein pertains to the irrigation of agricultural plants and the like and particularly pertains to irrigation processes and schedules involving multiple irrigation stations.

DESCRIPTION OF THE PRIOR ART AND OBJECTIVES OF THE INVENTION

Irrigation control has become increasingly important in recent years with the high costs of labor, plants, raw materials, water and other resources. Greenhouse owners, farmers and other growers today require optimum growth and minimum percentage plant death more than ever before to remain competitive. While water was once an inexpensive resource, it is becoming increasingly costly and now must be conserved for economical plant farming and greenhouse operation. Formerly, many varieties and sizes of plants were watered under a single, standard schedule. Now for conservation purposes, plant varieties have to be scheduled according to the type and size of the plants in order to save energy and water. Where it was once suitable to water an entire greenhouse according to a single schedule, now different plants and sections of the greenhouse may require multiple watering stations, each operating on independent schedules. Further, lightning is the number one cause of failure in the commercial controller industry.

Thus, in view of the problems and limitations of prior irrigation control systems, the present invention was conceived and one of its objectives is to provide an irrigation control system having an electronic controller with a high speed processor and a touch screen monitor for easy operation and simultaneous programming of multiple irrigation stations.

It is another objective of the present invention to provide an irrigation control system in which alterations can be made to irrigation schedules in a quick and convenient manner.

It is still another objective of the present invention to provide an irrigation control system which is modular in design to allow the system to expand based on the growing needs and rate of a particular owner.

It is yet another objective of the present invention to provide an irrigation control system which contains multiple independent programs with each program having multiple start times as needed.

It is also another objective of the present invention to provide an irrigation control system whereby any program can address any irrigation station and any irrigation station can be addressed by any or all programs.

It is a further objective of the present invention to provide an irrigation control system which will independently and simultaneously control multiple stations and programs.

It is still a further objective of the present invention to provide an irrigation control system which includes an AC power source input and station outputs which are protected from lightning and power surges.

It is yet a further objective of the present invention to provide an irrigation control system with a touch screen to provide graphic plots in twenty-four hour cycles for each station.

It is another objective of the present invention to provide an irrigation control system which includes a standard thumb drive containing programming data for both the operating system and the application programs.

It is still another objective of the present invention to provide an irrigation control system which allows for precise independent scheduling for each station.

It is yet another objective of the present invention to provide data storage in non-volatile memory to allow the programs of the irrigation control system to resume automatically after a power failure.

It is still a further objective of the present invention to provide a method of irrigating plants using an irrigation control system for a precise watering schedule which can be varied depending on the precise needs of the plants for optimum health and growth.

It is still yet a further objective of the present invention to provide an irrigation control system having an electronic controller with a high speed processor and a touch screen monitor for checking the system status and diagnostics system resulting in less down time and less maintenance cost.

Various other objectives and advantages of the present invention will become apparent to those skilled in the art as a more detailed description is set forth below.

SUMMARY OF THE INVENTION

The aforesaid and other objectives are realized by providing an irrigation control system and method which utilizes a high speed central processor and touch screen monitor. A conventional auxiliary circuit board is connected to a main circuit board both contained within a metal housing having a removable cover. The top of the metal housing is pivotally joined to a touch screen monitor affixed to the top of the housing for user convenience in activating, monitoring, programming, changing and/or adjusting irrigation schedules, diagnosing field problems, manually operating a station, and running a system test for any of the various watering stations. The main circuit board is powered by a USB power source having a USB processor mounted thereon. Output terminals on the main circuit board allow for connection of expansion modules. Each expansion module (module) can drive up to eight (8) independent irrigation stations.

The auxiliary circuit board includes a central high speed processor, ram memory, a ram memory slot, a display driver for the touch screen monitor and multiple USB ports. One USB port accommodates a pre-programmed thumb drive containing both the operating system and application software.

Each module includes an output microprocessor which is connected to zero crossing detector circuitry, station loop switches, lightening/over volt protection circuitry and open station loop switch circuitry.

The method of irrigating using the irrigation control system requires programming the central processor from the thumb drive, selecting the proper irrigation schedule by use of the touch screen monitor and operating the electric control valve of particular stations to irrigate the plants associated therewith.

BRIEF DESCRIPTION OF THE DRAWINGS

The patent or application file contains at least one drawing executed in color. Copes of this patent or patent application publication with color drawing(s) will be provided by the Office upon request and payment of the necessary fee.

DETAILED DESCRIPTION OF THE PREFERRED EMBODIMENT AND OPERATION OF THE INVENTION

Figure 1:
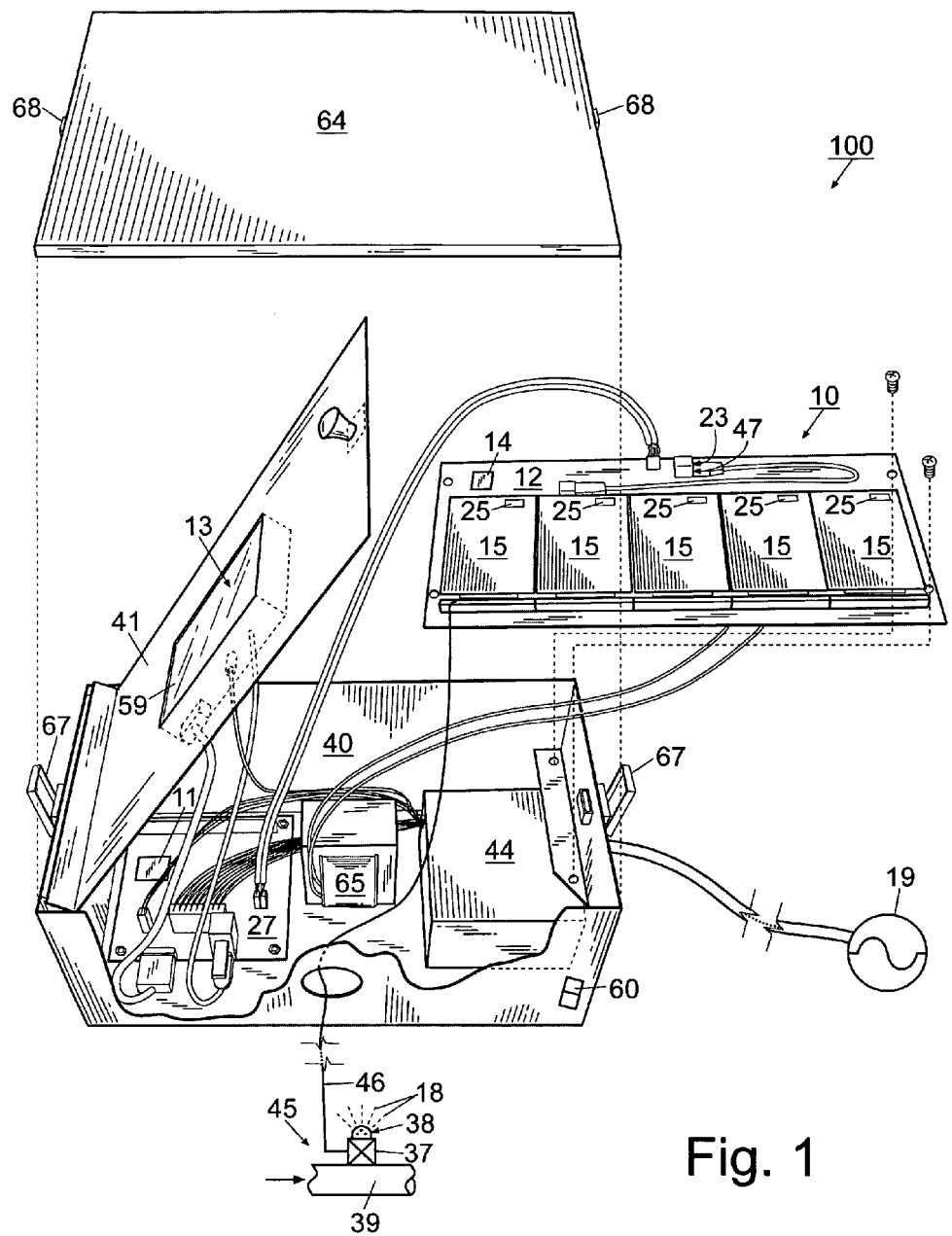
FIG. 1 shows the control system of the invention with the controller in cut-away perspective fashion.

Irrigation control system 100 allows efficiency for irrigation needs and simplified programming of multiple irrigation stations 45 as outlined below:
1. Forty-eight (48) individual programs:
   a) Six (6) start times in each program (multiple intervals controlled by each start time);
   b) Each start sequence can control multiple irrigation stations 45;
   c) All irrigation stations 45 can be controlled by multiple programs and start times;
   d) All irrigation stations 45 can be operated simultaneously;
   e) Minimum ON time is one (1) second;
   f) Minimum OFF time is one (1) second;
   g) Programs and irrigation stations 45 can be separately named, with names stored in non-volatile memory; and
   h) All programs operate twenty-four (24) hours/day;
2. Schedule:
   Minimum one (1) day; and
   Maximum thirty-two (32) days (any sequence);
3. Scaling (10% to 100%);
4. Suspension of program for a defined period with automatic restart;
5. Suspension of individual irrigation stations 45 with automatic restart;
6. Four (4) programmable sensor inputs;
7. "HELP" screens on a touch screen monitor integrated into the system program;
8. Automated system fault detection;
9. Manual Operation; and
10. Pump station user defined.

Free commercially available Linux operating system compatible with central processor 11 and USB processor 14 is used to convert the source codes of the application specific firmware/software and programs into machine language which central processor 11 and USB processor 14 (as seen in the Figs. herewith) can interpret. The application specific firmware/software and programs are loaded into central processor for programming the same with the application specific firmware/software and programs as described herein. The source codes of the application specific firmware/software and programs for preferred irrigation control system 100 are contained in the computer program listing appendixes submitted herewith.

For a better understanding of the invention and its operation, turning now to the drawings, FIG. 1 illustrates in schematic fashion preferred irrigation control system 100 with controller 10 connected to irrigation station 45 consisting of water line 39 and sprinkler head 38 for supplying water 18 which is connected to water control solenoid valve 37. All components of irrigation station 45 are conventional.

Controller housing 40 as seen in FIG. 1 is a powder-coated aluminum enclosure for controller 10 and is constructed to meet severe weather conditions and provides a well grounded, durable system. As an option a stainless steel enclosure may be provided. Top cover 64 on controller 10 is mounted with draw latches 67 and catches 68 allowing removal for access to touch screen monitor 13. When installed top cover 64 provides water resistance for controller 10.

Figure 2:
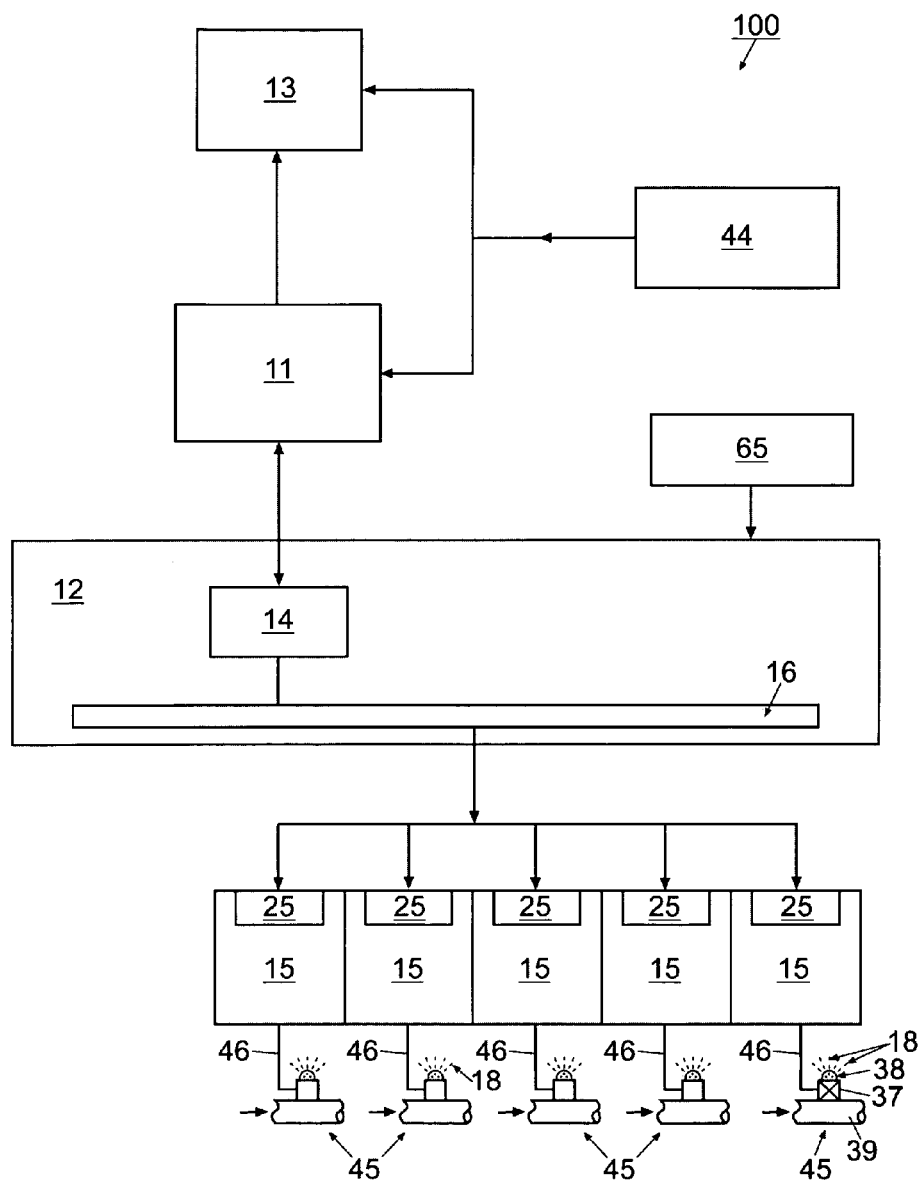
FIG. 2 illustrates a block diagram of the control system.
Figure 5:
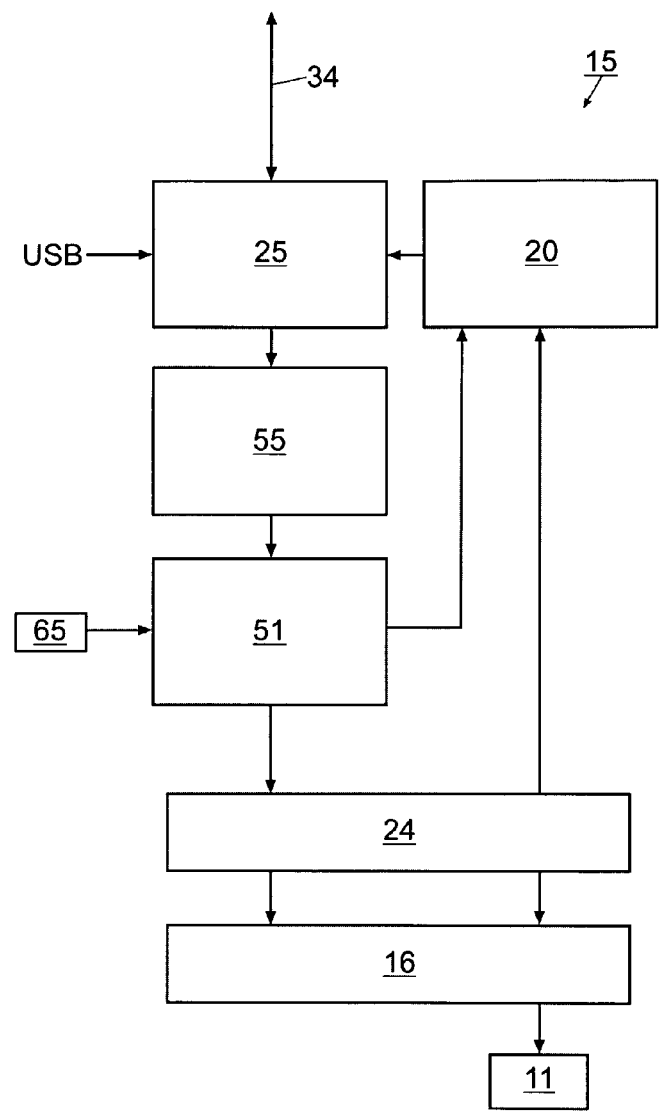
FIG. 5 depicts a block diagram of a single expansion module.

Water control solenoid valve 37 is joined by electrical conductor output wires 46 to expansion module 15 as shown in FIG. 2. Each expansion module 15 can accommodate up to eight (8) independent irrigation stations 45 but only one (1) irrigation station 45 is shown with each expansion module 15 in FIG. 2. Modules 15 each include preferred output microprocessor (Model No. PIC16F882/IS) as conventionally available from a number of sources with imbedded firmware. Expansion module 15 also seen in FIG. 5 includes open loop detector circuitry 20, zero crossing detector circuitry 55, 24V output station loop switch 51, lightening/over volt protection circuitry 24 and output terminals 16.

Preferred irrigation control system 100 seen in FIGS. 1-7 provides main circuit board 12, central high speed processor 11, input terminals 21 for up to four (4) event detectors, remote control input terminal 42 for remote control 43, touch screen monitor 13 to facilitate data backup/transfer, and module ports 22 to accommodate expansion modules 15 with communication paths, as well as the mounting for output terminals 16. All the data from central processor 11 as well as the DC voltage to power USB processor 14 on main circuit board 12 and expansion modules 15 is received from central processor 11 via USB ports 31 and 32 shown in FIG. 3.

All external inputs, for example event detectors or remote controls are protected from high voltage and high current surges (lightning) by lightening/over volt protection circuitry 24 (see FIG. 5) as described in more detail below.

Figure 3:
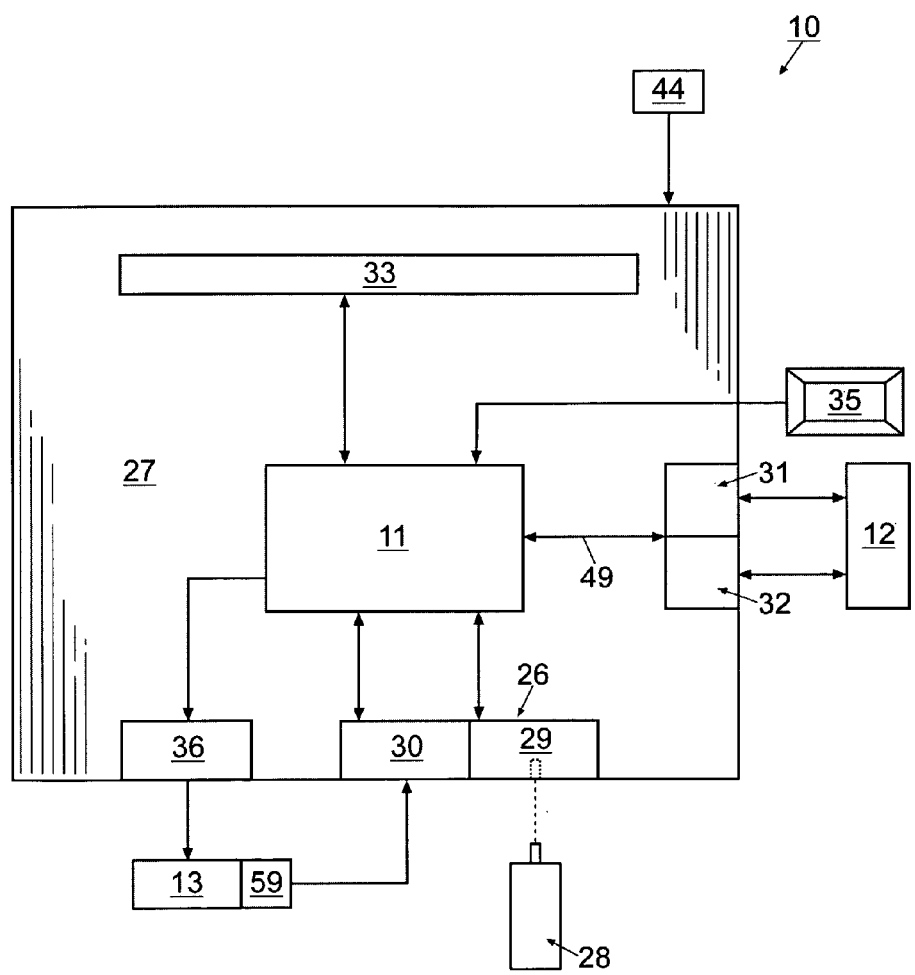
FIG. 3 demonstrates the auxiliary circuit board with the central processor in block fashion.

Central processor 11 as seen schematically in FIGS. 1 and 3 is preferably Intel Model 945GCLF in industry standard Mini ATX format and affords high speed computing power to implement irrigation application programs. USB ports 29, 30, 31 and 32, display monitor output 36, and mouse and keyboard outputs (not shown) are included on conventional auxiliary circuit board 27. Standard 512 MB RAM memory 33 is used. DC power is supplied by standard ATX DC power supply 44. Central processor 11 includes the necessary hardware and firmware/software to read/write to thumb drive 28, read/write to RAM memory 33, transfer bidirectional data via four (4) separate USB ports 29, 30, 31 and 32, and provide signal formatting and data transfer to drive touch screen monitor 13 and to accept data input for touch screen monitor 13. Although not used the ability to accept data via a keyboard and mouse (not shown) provides a communications capability that greatly aids software generation and factory production testing and trouble shooting.

Central processor 11 is capable of accepting large memory banks and application software fully functional within 512 MB of RAM memory 33. All irrigation control system 100 application firmware/software operates fully from RAM memory 33. Upon startup, system 100 loads all data to RAM memory 33 and application operations are implemented from RAM memory 33. Data is written back to thumb drive 28 in USB Port 26 only when the user makes a change in an application feature.

Central processor 11 is positioned on auxiliary circuit board 27 (FIG. 3) and USB processor 14 (FIG. 2) on main circuit board 12 receives data from central processor 11 and is the data path to output microprocessors 25 on expansion modules 15. Output microprocessor 25 times and formats all data to and from central processor 11 to expansion modules 15, as well as formatting the input data from the system status monitor circuitry 52 and directs this input data to central processor 11.

Figure 7:
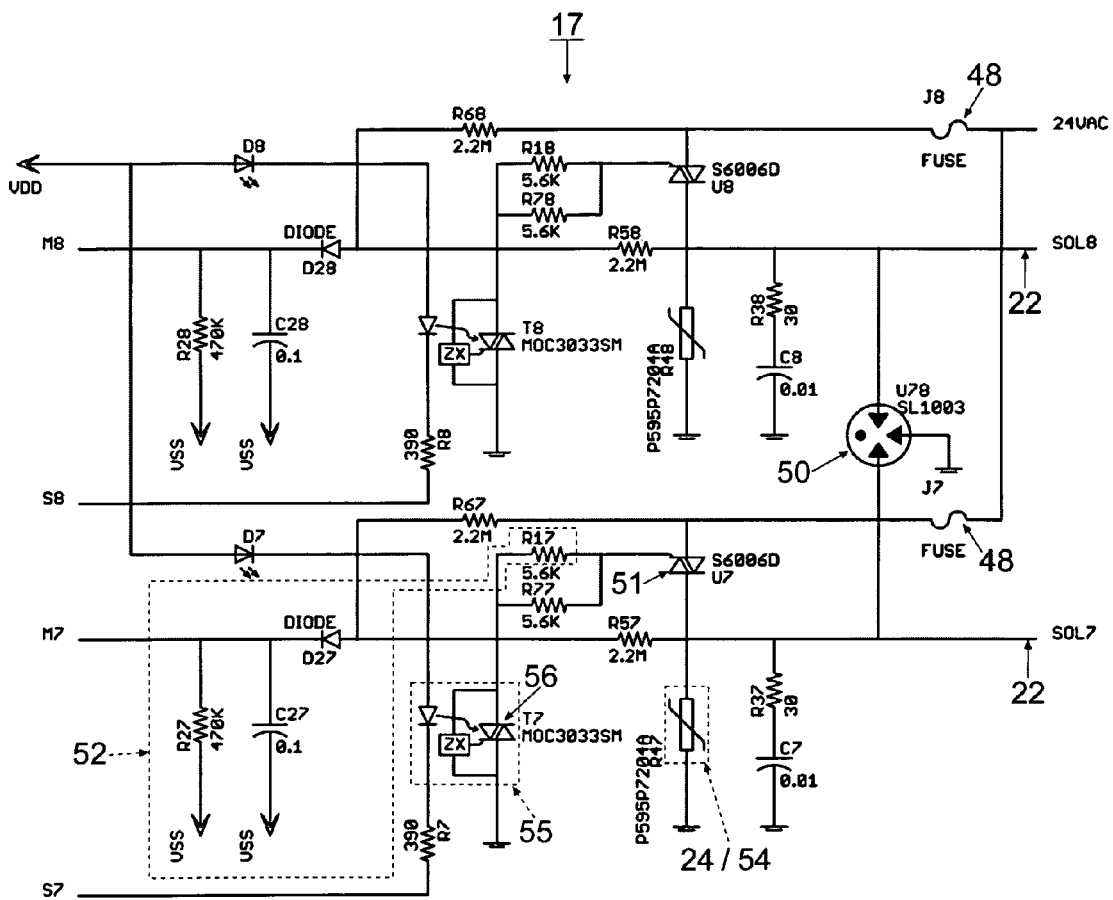
FIG. 7 shows a partial electric schematic diagram of an expansion module.

Main circuit board 12 ties all the components of irrigation control system 100 together. Functionality of main circuit board 12 is varied as it interfaces central processor 11 to expansion modules 15 as well as providing the communication path for the system status data from expansion module 15 to central processor 11. All the data from central processor 11 as well as DC voltage to power output microprocessors 25 are included and expansion modules 15 are received from central processor 11 via USB ports 31, 32. Input terminals 21 allow data from external sensors (not shown) to be directed to central processor 11, as well as input for remote control data to direct central processor 11 to implement specific actions. Main circuit board provides the capability for receiving up to five (5) expansion modules 15. Each expansion module 15 contains module circuitry 17 as seen in FIG. 7 which provides eight (8) module ports 22 (two (2) shown schematically in FIG. 7). Thus preferred irrigation control system 100 is capable of simultaneously driving up to forty (40) irrigation stations 45. Main circuit board 12 is the distribution interface for the low voltage AC to output terminals 16 (see FIG. 4) allowing replacement of expansion modules 15 without the necessity of rewiring output terminals 16.

Touch screen monitor 13 (FIG. 1) is a commercially available monitor manufactured by Intolux (China), Model# SSDA07007-T manufactured by Southeast Marketing and distributed by SSD Southeast of Fuquay Varina, N.C. Touch controller software drivers are standard offerings of the supplier.

Display monitor output 36 as seen in FIG. 3 provides the data path to drive touch screen monitor 13. Displayed on monitor 13 are various screens to direct the user in application data input via touch screen monitor 13 to select the desired action as well as to report the current selected application options. Also, irrigation control system 100 status is reported via touch screen monitor 13. Full function touch screen monitor 13 does not require "coded" readouts of usual industry products.

Touch screen programming for the user is available by utilizing seven (7) inch (17.8 cm) touch screen 59 seen in FIG. 1 of touch screen monitor 13 which is the user friendly interface to central processor 11 having 640×800 high resolution display. Programming, system status and system diagnostics of system 100 are all available at the touch of the user. Touch screen 59 allows programming new operation, checking on an old one, manually operating an irrigation station, diagnosing a field problem, or running a system test. A help screen is programmed into system 100 software and by touching the "?" at the bottom right corner of touch screen 59, access to system definitions are shown.

USB processor 14 shown in FIG. 1 is commercially available as part# PIC1F2455-I/SO. Firmware is written specifically for this application as described below. Data is transferred from USB processor 14 to output microprocessor 25 via expansion module bus connector 34 (see FIGS. 4, 5). The output from USB processor 14 and 24V output station loop switch 51 is also connectorized allowing expansion module 15 to be pluggable. This allows the user to replace expansion modules 15 without rewiring.

Expansion module output terminals 16 (FIG. 5) provide the path for the input of the low voltage AC signal to expansion module 15 and the output of eight (8) 24V output station loop switches 51 (only one (1) shown) contained on each expansion module 15. Each switch has both a source and a return path. Output terminals 16 are industry standard wiring terminals and are part of main circuit board 12 to allow replacement of expansion modules 15 without making wiring changes. Eight (8) output terminals 16 provide electrical connections for up to forty (40) irrigation stations 45.

Presence of an expansion module 15 on main circuit board 12 is detected by USB processor 14 thus customizing central processor 11 firmware to properly configure irrigation control system 100. This technique is commonly referred to as "Plug and Play". All activity of expansion module 15 is controlled via output microprocessor 25 under the direction of the installed firmware.

Expansion module output microprocessor 25 is a PIC16F882/IS available from a number of sources. Output microprocessor 25 receives data from central processor 11 via USB processor 14, decodes the address and operational data and directs the proper output station loop switch 51 to assume either an On or Off condition in one (1) second intervals. Output microprocessor 25 also receives data from open loop detector circuitry 20 and monitor circuitry 52 located on expansion module 15 (See FIGS. 5, 7) and reports this data to central processor 11 in a similar manner.

Zero crossing detector circuitry 55 (T1-T8) (only two (2) shown) (see FIGS. 5 and 7) routes signals to either turn On (or Off) a particular output station loop switch 51. The function of zero crossing detector circuitry 55 is to time the signal to output station loop switch 51 with the low voltage AC signal such that the actual switching occurs only when the AC voltage is at zero volts (thus the name zero crossing detector). The signal to either turn On (or Off) an output station loop switch 51 is routed via zero crossing detector circuitry 55 (FIG. 7) to output station loop switch 51. Zero crossing detector circuitry 55 is included to enhance reliability as irrigation station 45 output loops can be long. Water control solenoid valve 37 generates a high probability of high reflective voltages at the time of switching. By incorporating zero crossing switch 56 (# MOC3033SM) FIG. 7, switch 56 is only switched when the 24VAC is crossing zero (0) volts. This is the precise time when the alternating voltage changes from positive to negative (or vice versa) and minimizes the voltage and current reflections generated when switching electrically inductive loads.

System status monitor circuitry 52 (only one shown) allow output microprocessor 25 to read digital voltage during different stages of operation of output station loop switches 51. Expansion module 15 firmware directs the timing of the signal inputs to determine if system 100 is operating properly. Conditions that can be detected are: blown fuses and switch failure.

Lightening/over volt protection circuitry 24 (FIGS. 4, 5) and output wires 46 of controller 10 (see FIG. 2) are exposed to lightning. Each output port 22 as seen in FIG. 7 is protected by instrument grade fast acting electrical fuse 48 rated at 2.5 amperes. In addition each output port 22 is protected from extreme conditions such as lightning strikes. Gas discharge tubes 50 (part # SL1003)(U12, U34, U56, U78) one shown in FIG. 7 prevent instantaneous voltages from rising beyond a predetermined value and limit the instantaneous voltage at output terminals 16 to two hundred and thirty (230) volts. Gas discharge tubes 50 offer high voltage protection even in the absence of high currents. Lightening/over volt protection circuitry 24 and Metal Oxide Varistors 54 (MOV) (P7204) see FIG. 7 have the ability to shunt high instantaneous currents and can route up to two thousand (2000) amperes to electrical ground. A blown output fuse is a system status condition that will be reported to the user status screen.

Output station loop switches 51 seen in FIG. 7 control the flow of low voltage AC to output terminals 16. They are either On or Off as directed by output microprocessor 25.

Output station loop switch 51 as seen in FIG. 7 switches AC voltage as the output voltage to 24VAC to operate the station water control solenoid valves 37. Preferred output station loop switch 51 is a Triac (S6006D). The rated switching current is thirty (30) times the average current required to switch an industry standard solenoid for improved reliability. Also, the rated voltage is seventeen (17) times the actual switched voltage. This in conjunction with other protection devices provide a high degree of immunity for irrigation control system 100 to lightning. During the switching time, (once per second) output station loop switch 51 is monitored and any malfunction is reported to central processor 11 to be displayed to the user (not shown) on touch screen monitor 13.

Open loop detector circuitry 20 detects malfunctions and reports to central processor 11. An open fuse or a malfunctioning switch is detected on one (1) second intervals and reported to central processor 11. The user has the ability to view a "Status Screen" that is a composite reporting of all monitored functions of individual irrigation stations 45 as seen in FIG. 2.

Shown in FIG. 3, USB Port 26 accepts standard thumb drive 28. Software (Linux) for preferred irrigation control system 100 and proprietary application software reside on thumb drive 28. This allows updating of proprietary application software for the user. Changing thumb drive 28 to an updated version of software is therefor easily accomplished as all programs/data are stored on thumb drive 28.

USB Port 31 is the bidirectional data transfer port of all operational data and allows transfer of operation data to main circuit board 12 and for receiving data pertaining to the operational status of irrigation control system 100. Application data from central processor 11 to main circuit board 12 includes the address of the output station loop switch 51 and its operation status (On or Off). Data is sent from central processor 11 and transferred via USB port 31 to main circuit board 12 and consequently to expansion module output microprocessor 25 on one (1) second intervals. The status of control system 100 is "poled" at one (1) second intervals. Also, at one (1) second intervals, central processor 11 poles expansion module 15 via main circuit board 12 as to irrigation control system 100 status. The external input data, whether from touch screen monitor 13, external sensors (not shown) or remote control 43 (FIG. 4) is sent to central processor 11 via USB port 31.

USB Port 32 provides backup and restore capabilities to irrigation control system 100. After the user has implemented applications, data can be stored in a backup thumb drive (not seen) for "disaster recover" occasions and connected to USB port (FIG. 3). Also, USB port 32 can be used to implement a transfer of application data to a new system software thumb drive (not seen) using the familiar "backup and restore" routines common to the industry. As further seen in FIG. 3, USB port 30 accepts data from touch screen monitor 13. This is user data input to implement the desired program features.

Figure 4:
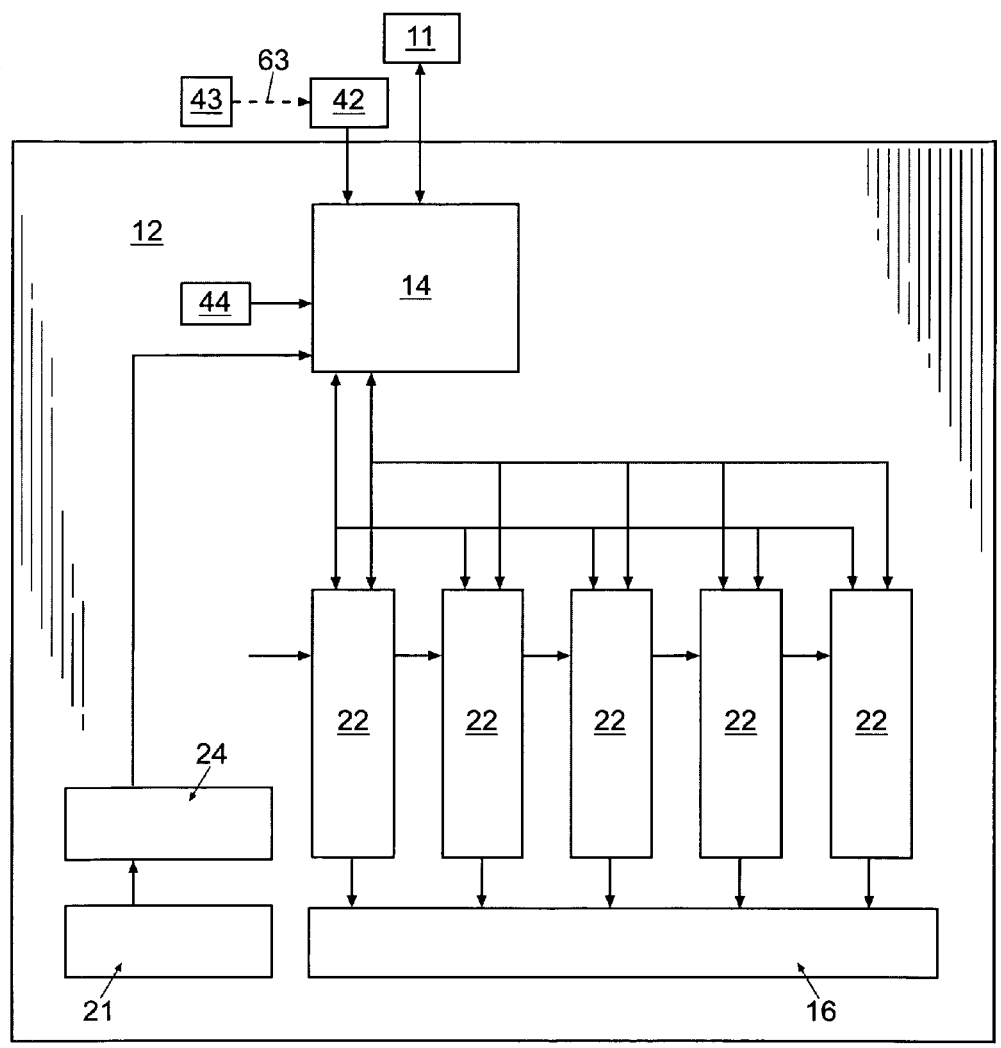
FIG. 4 pictures the main circuit board with the USB processor in block representation.
Figure 6:
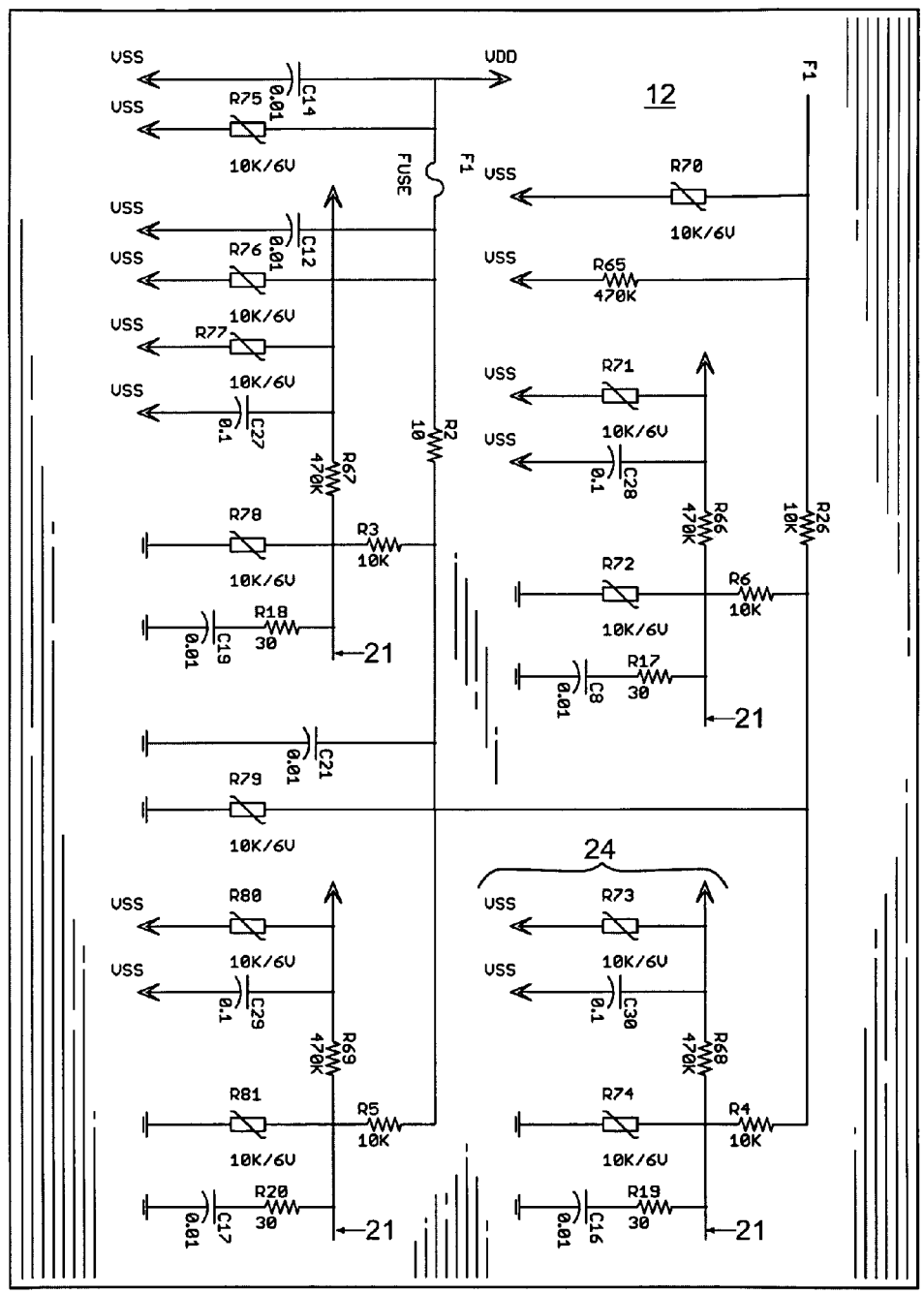
FIG. 6 features an electrical schematic of external inputs of the circuitry on the main circuit board.

Input terminals 21 and associated circuitry (R17, R66, R65, R71, R70, C8 and C28) are typical input ports (FIG. 6) which accept digital data from external sensors (not shown) and remote control 43. Input terminals 21 (FIG. 6) serve two (2) main functions, to condition the data (signal) and to protect the circuitry from external voltages typically produced by lightning. External sensor input signals are routed onto main circuit board 12 via input terminals 21 (FIG. 4). These signals are conditioned via electronic components associated with input terminals 21 (FIG. 6). After conditioning, the signals are routed to USB processor 14 (FIG. 4) which routes these data signals to central processor 11 via USB Port 31. Remote data signals 63 are routed onto main circuit board 12 via remote control input terminal 42 (FIG. 4). After conditioning and electrical isolation via opto-isolator (not shown), the conditioned signals are routed to USB processor 14. USB processor 14 then routes these signals to central processor 11 via USB Port 31.

Remote control input terminal 42 (FIG. 4) is configured to accept remote data signals 63 from remote control 43 whereby remote data signals 63 are conditioned and routed to USB processor 14 and thus to central processor 11. Remote data signals 63 enter main circuit board 12 via remote control input terminal 42, (FIG. 4) and is electrically isolated from all other internal circuitry via opto-isolator (not shown). The associated components (not shown) condition and protect circuitry (not shown) in a similar fashion as those associated with input terminals 21. The transmitted data directs that certain irrigation stations 45 be operated for a specified time.

DC power supply 44 as seen in FIG. 2 converts incoming 110VAC to the necessary DC voltages needed to operate central processor 11 and monitor 13. DC power supply 44 also provides the 110VAC necessary to operate the low voltage AC power supplied from heavy duty transformer 65 seen in FIG. 1. Transformer 65 is protected from overload by a fused input source from AC power source 19 and is capable of providing ten (10) amperes of current. This is 125% of the current needed to operate forty (40) water control solenoid valves 37 rated at 200 ma each.

When control system 100 is needed to be enlarged, each expansion module 15 will add eight (8) additional irrigation stations 45. From an initial control system of eight (8) stations 45 to a control system of forty (40) stations 45.

Figure 8:
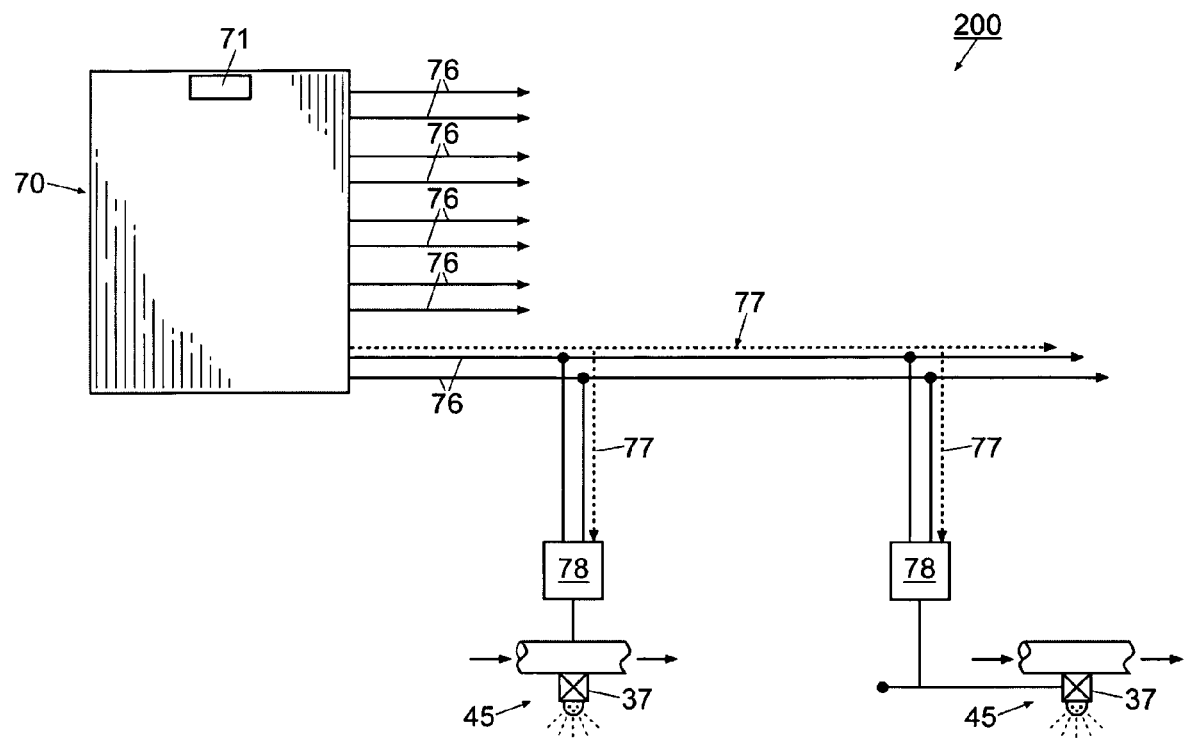
FIG. 8 illustrates a schematic view of an alternate two wire expansion module.
Figure 9:
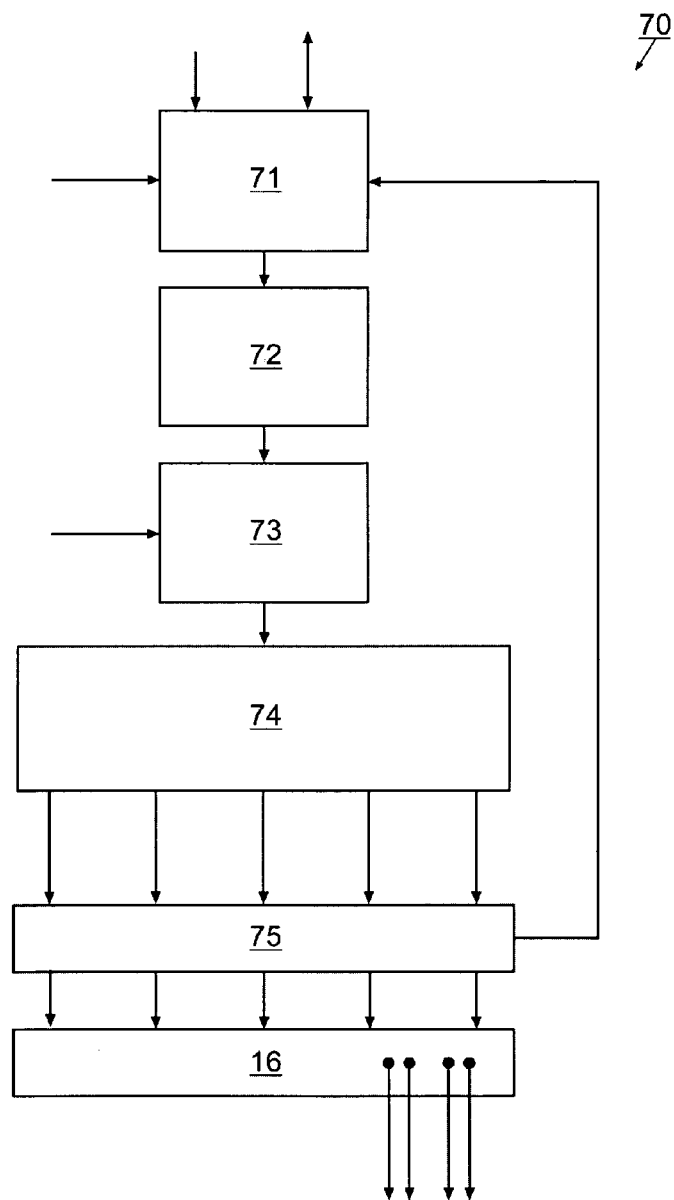
FIG. 9 depicts the two wire expansion module of FIG. 8 in block representation.

For additional system enlargement, up to two hundred thirty two (232) irrigation stations 45 can be controlled by using alternate expansion module 70 as seen in alternate irrigation control system 200 shown in FIG. 8. Alternate irrigation control system 200 routes two (2) output wires 76 to irrigation stations 45. As seen in FIG. 9 in the alternate form expansion module 70 consists of an output microprocessor 71, RF code generator 72, 24VAC mixer 73, output drivers 74 and lightening/over volt protection circuitry 75. Output microprocessor 71 encodes the address of each station 45 in a burst of high frequency voltage 77 (FIG. 8) that is superimposed on the 24VAC that provides the power to operate water control solenoid valve 37. At each water control solenoid valve 37 is decoder 78 that is programmed with a specific electrical address. In addition to the address is the operation command (On/Off) thus RF code generator 72 is a 24VAC "bus" with superimposed high frequency data. Thus alternate two (2) wire expansion module 70 is compatible with main circuit board 12. Five (5) two (2) wire system outputs are each capable of controlling up to forty (40) irrigation stations 45. Each alternate expansion module 70 could control up to two hundred (200) irrigation stations 45. Four (4) more expansion modules 15 may be installed for a total of two hundred thirty two (232) stations.

Forty-eight (48) application programs, all stored in thumb drive 28 are completely independent. All forty-eight (48) programs are active 100% of the time and programming is easy via touch screen 59. Any program can control any of irrigation stations 45 which can be controlled by any number of the forty-eight (48) programs. Special programs are easily implemented through USB ports 26, 30, 31 and 32 which allow input and special programs with the operation of a detector or switch (not seen). Programmed actions (both on and off) can be as brief as one (1) second and as long as twenty-four (24) hours for soaking or misting applications for each irrigation station 45. Misting on and off times are independently set and either can be a minimum of one (1) second. The interval between misting is also independently set to a desired time. Flexibility such as this assures healthy plants with a minimum risk of fungus and disease. The cycle to repeat (1 to 9) and mist for hours using only one start time is set and correct water usage maximizes benefit while reducing cost. In the alternate two wire configuration system 70, each of the six (6) systems will be directed by forty-eight (48) programs as described above. Each of the forty (40) irrigation stations 45 constitute a "water system" and each water system has full capabilities as described herein.

Each of the six (6) independent irrigation start times per program available for each irrigation station 45 are multiplied in effectiveness by the ability to repeat at a user defined interval. One start time with a repeat interval of ten (10) minutes is equivalent to one hundred and forty-four (144) start times per day. Each start time is completely independent of the other five (5) start times. Start times and run times are not related. Any number of irrigation stations 45 can be started at the same time, each with a different run time. Scheduling of each station 45 from one (1) day to thirty-one (31) days is available by touching the days on touch screen 59 as needed.

Accessing the schedule of any individual irrigation station is accomplished from the status screen for monitor 13 by pressing the SCHEDULE button on touch screen 59 for any station 45 and it will display a twenty-four (24) hour schedule graph for the selected station 45. The presented graph is for "today" but a touch of the "next day" button advances the screen in twenty-four (24) hour increments. Reverse scrolling is possible by pressing the "previous day" button. Knowing the detail schedules means efficiency in work crew assignments. Irrigation soak control using touch screen 59 allows each start time to be programmed independently with a given interval. The user defines a precise amount of water needed, as well as the precise soak time. Multiple programs for each station 45 of the forty-eight (48) independent programs can address any of stations 45 available. Each station 45 can be assigned a different run time. This flexibility provides precisely the correct amount of water to various plants and conditions.

Controller 10 contains a high power output source that is capable of providing sufficient power to operate forty (40) irrigation stations 45 at once. All stations 45 can be programmed to supply the precise amount of water needed and at the most beneficial time.

As all stations 45 are independently controlled the designation of a pump control (sometimes called master valve) can be chosen. An irrigation station 45 chosen for the designation of pump control will be denoted with a "P" on the system status display screen on monitor 13 as a reminder that this particular irrigation station 45 has a special application. Using touch screen 13 any irrigation station 45 can be designated as the "pump station".

Programs can be named to identify functions or locations. Names to match the location, i.e. "Greenhouse #1" or "Front Lawn", or the name can reflect the function, e.g. "Misting", assuring the user of the functionality of each program and its intended purpose. This is accomplished through touch screen 59 as are renaming of programs.

Also, naming of individual irrigation stations 45 is an easy option. Individual stations 45 can be named to remove any user doubt as to the location or purpose of the particular station 45. This list is available from any screen on monitor 13 that has a time indicator in the lower right of the screen. By pressing touch screen 59 a full listing of station 45 names is available and once reviewed pressing the list will return the user to the previous screen.

Weather compensation can be applied to any program independently with the adjustment user defined in percentage of programmed value. Compensation can vary from 10% to 99%. The precise amount of water that the situation dictates is the economical solution. There is no need to reset the compensation. Upon initial setting, the user can define a "stop date". At the end of the prescribed time, controller 10 returns to the original programmed rates.

Operation of stations 45 outside of programmed schedules is also available as every station 45 is independently controlled. Each station 45 can be operated indefinitely or for a prescribed length of time. Using touch screen 59, a designated station 45 can be turned "on" or "off" with the touch of a finger.

System status is easily determined by accessing the status screen on monitor 13. Each station 45 is represented on touch screen 59 with a touch button. All active irrigation stations are highlighted. If a fault has been detected on a particular station 45, it is displayed in red. Specific status of each station 45 will be displayed on the left of touch screen as each station 45 button is pressed. The controlling program(s) of each station 45, as well as instantaneous information detailing the present state (on or off) of designated station 45 is a part of this. Monitor circuitry 52 within expansion modules 15 will report either of two (2) fault conditions, defective fuses (plug in replacement), and non-functional loops. This allows for quick location and correction of faults.

Optional software (not shown) is installed on an office computer to allow complete programming from the comfort of the office. The user can program the entire system 100 or make changes to match new requirements by plugging a thumb drive (not shown) into a convenient USB connection on the office computer to save. Next, the programmed thumb drive (not shown) is transported to controller 10 and installed into backup/restore USB port 23 located on main circuit board 12 and by pushing central processor reset button 35 (FIG. 3) central processor 11 will download the new program into RAM memory 33 and the entire program will begin operation within seconds.

Module circuitry 17 as well as auxiliary circuit board 27 and main circuit board 12 within controller 10 are protected from external surges. Lightening/over volt protection circuitry 24 and Metal Oxide Varistors (MOV's) 54 protect the circuitry from high surges of current. Gas discharge tubes 50 (GDT's) protect circuits such as seen in FIGS. 6 and 7 from external induced high voltage spikes. Expansion modules 15 are also protected by fast acting instrument fuses 48 (FIG. 7) and when faults occur, the fuses (not shown) protect the remaining circuitry within controller 10.

In addition to the self diagnostics of faults described above, controller 10 can exercise a self test which will exercise each irrigation station 45. The amount of time each station 45 is active can be selected by the user (default is one (1) second). This sequence of testing can be stopped and started at any time in the test. The start button on touch screen 59 becomes the stop button during operation, facilitating an easy "stop-start" manual sequence.

The programming flexibility and capacity of controller 10 make it a natural for many applications. Office lights, signage, security systems, green house ventilation, area lights, heaters, circulation pumps, are but a few of the electrical applications that can be controlled with ease by system 100.

Irrigation Control System Method Programming

Figures 10, 11:
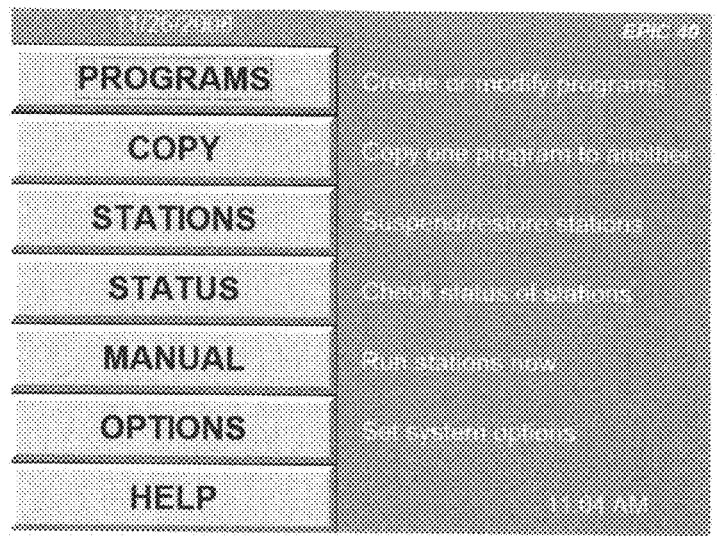
FIG. 10 shows an example monitor screen entitled: System Screen A.
FIG. 11 shows an example monitor screen entitled: Status Screen B.

The preferred method of irrigation utilizing irrigation control system 100 includes the steps of first mounting and connecting system 100 to a 110VAC power source. Irrigation control system 100 is activated by turning power switch 60 (FIG. 1) found on the right side of controller housing 40 to "ON". After approximately one (1) minute central processor 11 loads the operating system and application programs from thumb drive 28 and touch screen monitor 13 should appear, for example, as seen in FIG. 10 showing an example screen entitled: "System Screen A".

The programming choices as seen by "System Screen A" are identified on touch screen monitor 13. "Functional hints" are located beside each option button.

Pressing the "STATUS" button on "System Screen A" provides a screen (shown in FIG. 11) listing all system irrigation stations 45 numbered for example 1-40. Pressing a particular irrigation station 45 button lists the status of that station 45 such as seen in FIG. 11 by "Status Screen B" shown if irrigation station 45 (designated as Station #1) is selected:

"Status Screen B" displays all irrigation stations 45 and their status. "Status Screen B" as shown in FIG. 11 is a typical screen for a forty (40) station irrigation system.

Color indicators (not shown) are provided along the bottom of "Status Screen B" in FIG. 11 to indicate the program status and if an individual station 45 has a detected fault. The program status may be identified as either "running", "no program", "programmed" or "fault". For example, station #19 may be running and the number "19" would be seen in the color blue on "Status Screen B" identifying this station as "running", station #6 may not have a program and the number "6" would be seen in the color green identifying this station as having "no program", station #28 may be programmed whereby the number "28" would be seen in the color black identifying this station as "programmed" and if a station button is seen in the color red that station has a "fault". By pressing the specific station 45 number, such as #12 a more detailed status of selected station #12 is revealed (station #1 shown). Shown in the left column of "Status Screen B" (FIG. 11) is the following information:

A. SCHEDULE button;
B. The irrigation STATION selected and the location of expansion module 15 shown as "Station 1/Module 1";
C. Which program(s) are addressing this station shown as "PROGRAM(S): 2, 3"; and
D. Fault information (a simulated blown fuse is shown, with the fuse number and its location within the system reported) shown as "Replace FUSE! leftmost fuse".

Figure 12:
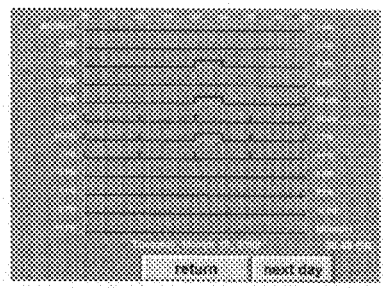
FIG. 12 shows an example monitor screen entitled: Station Schedule Screen C.

Pressing the "SCHEDULE" button on "Status Screen B" activates "Station Schedule Screen C" shown in FIG. 12.

"Station Schedule Screen C" shows a twenty four (24) hour graphical display of the full schedule of a selected irrigation station 45. Individual stations 45 can be addressed by multiple programs and start times. The graph as shown in FIG. 12 has five (5) minute increments but will report operations as short as one (1) second. The day of the reported operations is reported at the bottom of the graph above the buttons "RETURN" and "NEXT DAY". Pressing the "NEXT DAY" button will graph the schedule for the following day. Pressing the "NEXT DAY" button also activates a "PREV DAY" button. Thus the user can move "forwards or backwards" to look at all schedules for the particular irrigation station 45 selected. The number located at the bottom right (00:49 ON) indicates the accumulated run time of this station 45 for this particular day. "RETURN" directs the system to the previous screen.

Figure 13:
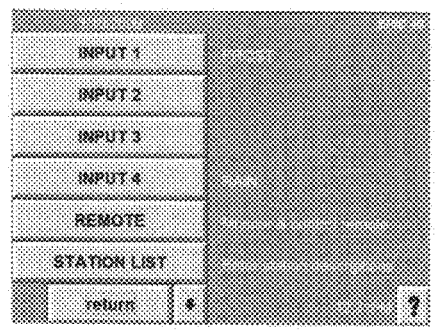
FIG. 13 shows an example monitor screen entitled: Input Screen

Upon initial installation, the initial system parameter options for irrigation control system 100 must be set in order for system 100 to operate correctly. Pressing the "OPTIONS" button on "System Screen A" as seen in FIG. 10 will activate "Input Screen D" as shown in FIG. 13.

Figure 14:
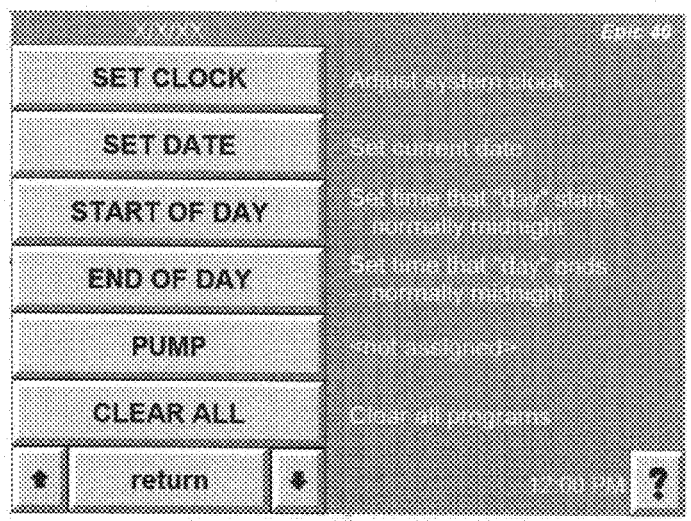
FIG. 14 shows an example monitor screen entitled: System Screen (Second Option) E.

"Input Screen D" (FIG. 13) allows configuration of input terminals 21 (FIG. 6) and remote control input terminal 42 (FIG. 4). By pressing the "down arrow" button on "Input Screen D", "System Screen (Second Option) E" as seen in FIG. 14 appears.

Figure 15:
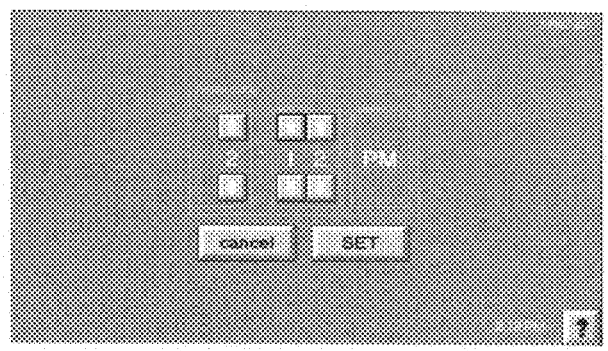
FIG. 15 shows an example monitor screen entitled: Clock Set Screen F.

"System Screen (second option) E" (FIG. 14) includes buttons for "Set Clock", "Set Date", "Start of Day", "End of Day", "Pump" and "Clear All" as well as "return", "up" and "down" arrows and a help button "?". Pressing the "Set Clock" button activates "Clock Set Screen F" as seen in FIG. 15.

Pressing the appropriate "hour", "minutes", "AM" or "PM" buttons allows the correct time to be set for the clock of irrigation control system 100. The time set will be displayed on the bottom right of the screen. Power interruptions should not "reset" the clock. When the correct time is displayed, pressing the "SET" button on "Clock Set Screen F" sets the clock and then "System Screen (second option) E" returns whereby the "SET DATE" button can be pressed to activate "Set Date Screen G" shown in FIG. 16.

Arrows on each side of the calendar month allow the correct month to be chosen whereby the correct day can be selected. Once the correct day and month have been selected, by pressing the "SAVE" button on "Set Date Screen G" (FIG. 16) the "System Screen (second option) E" (FIG. 14) returns whereby the "START OF DAY" button can be pressed.

The "START OF DAY" button provides time input allowing the user the option of starting the day at some time other than 12:00 AM (SYSTEM DEFAULT). This allows special need irrigation cycles to start and finish within the same defined day. Pressing the "START OF DAY" button will activate the "Set Start of Day Screen H" shown in FIG. 17.

The desired start time can be entered by pressing one of the time numbered buttons. For example, pressing "Noon" and then pressing "SAVE" stores the time and will return the user to "System Screen (second option) E" (FIG. 14) for further options.

Figure 17:
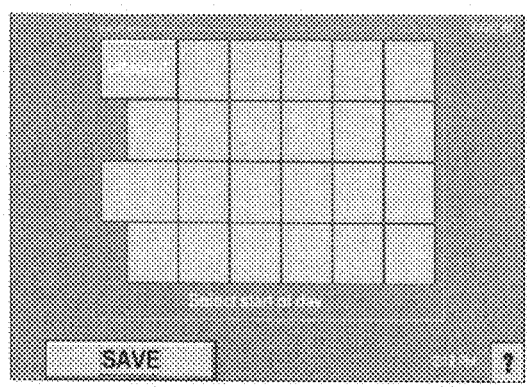
FIG. 17 shows an example monitor screen entitled: Set Start Of Day Screen H.

Pressing the "END OF DAY" button on "System Screen (second option) E" (FIG. 14) will display a screen (not shown) similar to the "Set Start of Day Screen H" shown in FIG. 17 which will allow the user to select an end of day time to correspond with the start of day time set as previously discussed.

Figure 18:
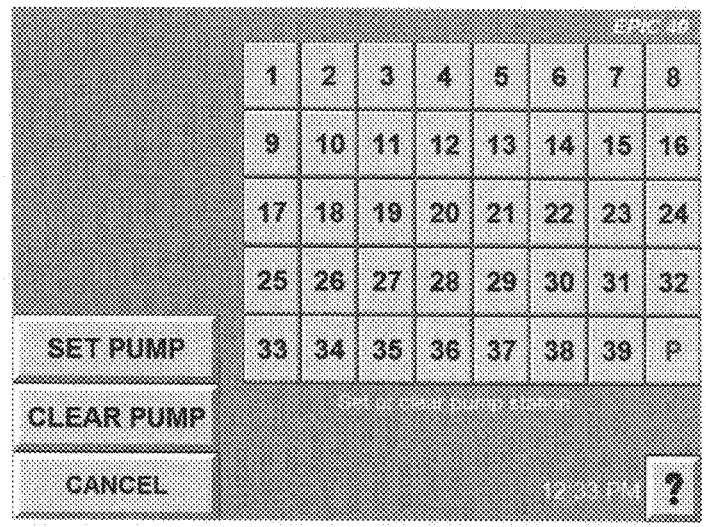
FIG. 18 shows an example monitor screen entitled: Set Pump Screen I.

Pressing the "PUMP" button on "System Screen (second option) E" (FIG. 14) activates "Set Pump Screen I" as shown in FIG. 18 which allows the user to designate any irrigation station 45 as a "pump station". The "pump station" has a special function allowing the user to link any of irrigation stations 45 to the designated "pump" station 45. Operation of any of the linked stations 45 will operate the designated "pump" station 45.

Figure 19:
FIG. 19 shows an example monitor screen entitled: Pump Link Screen J.

By pressing the number of the station desired to be the "pump station" the selected station number will be changed to the letter "P" and shown in the color red (not shown). As seen in "Set Pump Screen I" in FIG. 18, irrigation station 45 designated as #40 is the designated "pump station". Pressing the "SET PUMP" button will save the selection and activate "Pump Link Screen J" seen in FIG. 19.

Irrigation stations 45 designated to be linked to the selected "pump station" #40 can be selected by touching the desired station button. Any or all irrigation stations 45 can be so designated. "Pump Link Screen J" (FIG. 19) indicates irrigation stations 45 designated #1, #3, #5, and #7 (shown raised) are linked to the designated "pump station" #40. When any program operates either of the stations 45 designated #1, #3, #5, and #7, the "pump station" #40 will be operated. Once selection is complete press the "SAVE" button which will return the user to "System Screen (second option) E" (FIG. 14) for further options.

Figure 20:
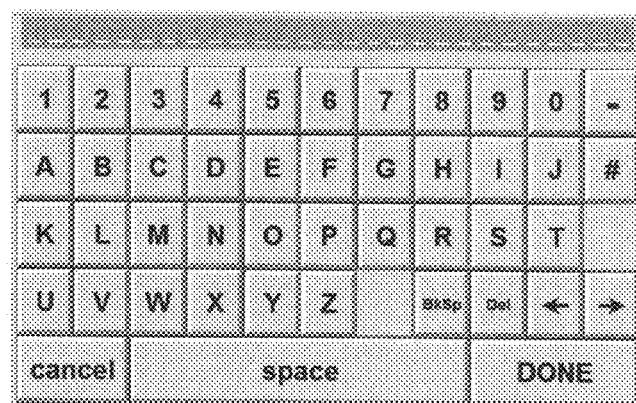
FIG. 20 shows an example monitor screen entitled: Keyboard Screen K.

The selection "CLEAR ALL" on "System Screen (second option) E" as seen in FIG. 14 should be used with caution as this will clear all programs in irrigation control system 100. If the user accidently activates the "CLEAR ALL" button, system 100 requests "Are you sure?" allowing the user to reply "Yes" or "No". By selecting "CLEAR ALL" upon initialization of new irrigation control system 100 clears any test programs that may remain in system 100 for factory testing. Upon user selection system 100 returns to "System Screen (second option) E" whereby the user can select "RETURN" and go back to "Input Screen D" shown in FIG. 13. Here the user can designate the functionality and program the four (4) inputs and by pressing the screen to the right of either of the INPUT buttons will activate "Keyboard Screen K" seen in FIG. 20.

Pressing the appropriate keys on "Keyboard Screen K" (FIG. 20) will allow the user to name each program. In the example shown by "Input Screen D" in FIG. 13 "INPUT 1" is named "FROST" and "INPUT 4" is named "RAIN".

Figure 21:
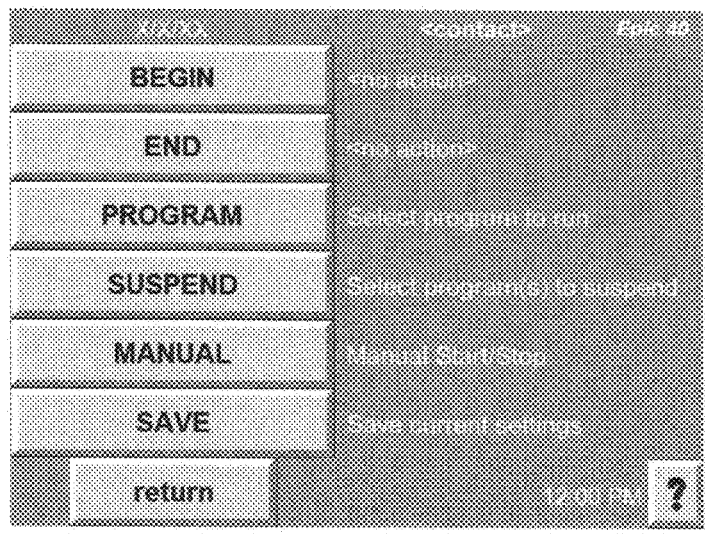
FIG. 21 shows an example monitor screen entitled: Input Programming Screen L.

Pressing any one of the four (4) "INPUT" buttons on "Input Screen D" (FIG. 13) activates "Input Programming Screen L" shown in FIG. 21 which allows the user to define the parameters of the selected input.

Controller 10 as shown in FIG. 1 of irrigation control system 100 is designed to operate with a number of commercially available sensors. Certain sensors provide a "contact closure" upon activation.

As seen in FIG. 21 "Input Programming Screen L" includes buttons for "BEGIN", "END", "PROGRAM", "SUSPEND", "MANUAL" and "SAVE" for user selection as well as a "RETURN" button and the "?" (help) button. By pressing the "BEGIN" button, the activation mode will alternate between "CONTACT CLOSED", "CONTACT OPEN", and "NO ACTION". The user can select "NO ACTION" to disable the input.

The "END" button on "Input Programming Screen L" (FIG. 21) automatically alternates between the opposite of the start button which allows system 100 to be configured to match the selected sensors.

The "PROGRAM" button on "Input Programming Screen L" (FIG. 21) provides for selection of a program or multiple programs which have been designed to operate when the sensor is activated. Pressing the "PROGRAM" button activates a screen (not shown) that has a button corresponding to each program in system 100. Pressing the desired program will designate the selected program to be activated IF the sensor is activated. After a program is designated, when the user goes to that program location, the designation of the program will be "INPUT X PROGRAM" and this program will only have one start time (start time is when activated).

The "SUSPEND" button on "Input Programming Screen L" (FIG. 21) provides the user with the capability to suspend active programs while the sensor is activated. Selecting a program(s) to be suspended is the same procedure as selecting a program(s) to be activated (see above paragraph).

The "MANUAL" button on "Input Programming Screen L" (FIG. 21) allows the user to initiate the actions specified by the input programming.

The user after selection and desired data input should press the "SAVE" button on "Input Programming Screen L" (FIG. 21). When the sensor returns to "normal" conditions, irrigation control system 100 will resume operation of all programs.

For example, CASE 1, a Frost Sensor (contact closed) is connected to input 1. The program numbered thirty-five (35) has been implemented to provide the desired irrigation during a frost situation. All other programs have been selected to be suspended during the first frost situation. When the frost sensor or detector is activated, ALL designated programs will be suspended, and the SELECTED program will be implemented. When the sensor determines that frost is present, the switch is operated, and system 100 responds by implementing the designated program(s). An alternate method would be to go directly to "System Screen A" as shown in FIG. 10 and select the "MANUAL" feature.

Figure 22:
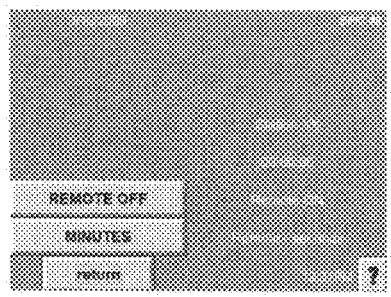
FIG. 22 shows an example monitor screen entitled: Remote Setup Screen M.

For remote operation, pressing the REMOTE button on "Input Screen D" (FIG. 13) activates the "Remote Setup Screen M" shown in FIG. 22.

The "REMOTE OFF" button on "Remote Setup Screen M" allows the user to disable remote control 43 by setting the remote to OFF. This is a toggle button between "on" and "off".

The "MINUTES" button on "Remote Setup Screen M" allows the user to activate remote control 43 in seconds rather than the system default of minutes. The remote mode is indicated to the right of the button.

On the right of the "Remote Setup Screen M" is the information section illustrating "Station XX" which reports if a station is activated via the remote. Just below this is the time information. The reported time is the remaining time of the remote activation.

By returning to "Input Screen D" (FIG. 13) the last selection on this screen is "STATION LIST". This unique feature allows the user to name each irrigation station 45 within system 100. Pressing the "STATION LIST" button activates a screen (not shown) with a numerical field of buttons corresponding to each station 45. Pressing the "NUMBER" button of any station 45 will activate the familiar "Keyboard Screen K" (FIG. 20) whereby the user can individually name each station 45. Pressing "DONE" will save the individual station 45 names.

The retrieval of individual station 45 names is unique as the list can be retrieved from any screen in the system that has a "TIME TAG". The "TIME TAG" is the "notation of time" found in the bottom right of most screens as seen for example on "Input Screen D" in FIG. 13. Pressing the "TIME TAG" will activate a "station list screen" (not shown) displaying all station 45 names thus allowing the user access to the list of station 45 names from anywhere in system 100 this information is needed. Pressing the "station list screen" will return the user to the particular screen from which the "station list screen" was activated. This feature precludes the need to scroll to the list and back to the particular screen where the information is needed.

The OPTION screen (not shown) (by pressing OPTIONS as seen on "System Screen A" in FIG. 10, then the "down arrow" twice) has three buttons "BACKUP", "RESTORE" and "VERSION". The "BACKUP" button allows the user to make a backup record of system 100 programs which can be done at any time. Placing a backup thumb drive into USB port 23 (FIG. 1). Opening controller housing top 41 reveals double USB ports 23, 47. With a system cable in the bottom slot of USB port 47 and a backup thumb drive inserted into the top slot of USB port 23, the user is ready to make a backup copy for the system programs simply by pressing the "BACKUP" button.

To restore the system using a backup copy, insert the backup thumb drive into USB port 23 shown in FIG. 1 and press the "RESTORE" button. The system 100 programs will be restored to the backup position. The backup thumb drive should not be stored in system 100 as this may cause system 100 to malfunction and backup data may be lost.

Pressing the "VERSION" button will report the version of the system 100 software. Pressing the "RETURN" button twice will return system 100 back to "System Screen A" shown in FIG. 10. From here the user can begin defining the irrigation programs.

Figure 23:
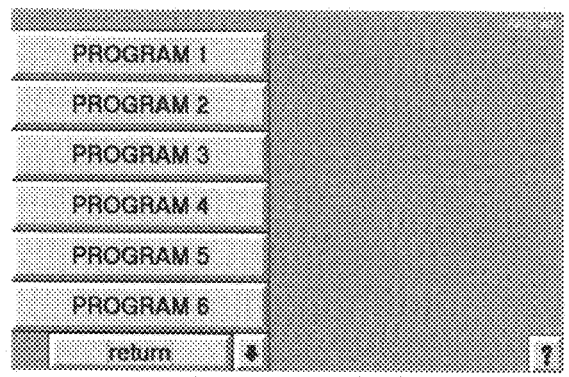
FIG. 23 shows an example monitor screen entitled: Program Selection Screen N.

Control programming selections are implemented by pressing the "PROGRAMS" button on "System Screen A" which activates "Program Selection Screen N" shown in FIG. 23.

As earlier described forty-eight (48) independent programs are available (pressing the "down arrow" scrolls through the programs) in irrigation control system 100. By pressing to the right of the "PROGRAM X" button, "Keyboard Screen K" (FIG. 20) is activated. Using standard input procedures, the program can be named. This can relate to the location, application, or any name the user desires. Pressing the "PROGRAM X" button activates "Program Definition Screen O" seen in FIG. 24.

"Program Definition Screen O" (FIG. 24) includes the buttons: "START TIMES", "START DAY", "SCHEDULE", "SCALE", "SUSPEND", "CLEAR" as well as "RETURN", "?" (help) and the "TIME TAG". Pressing the "START TIMES" button activates "Start Time Screen P" shown in FIG. 25 revealing each of the six (6) start times within each program.

Figure 25:
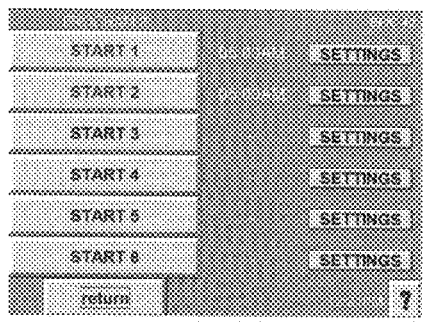
FIG. 25 shows an example monitor screen entitled: Start Time Screen P.
Figure 26:
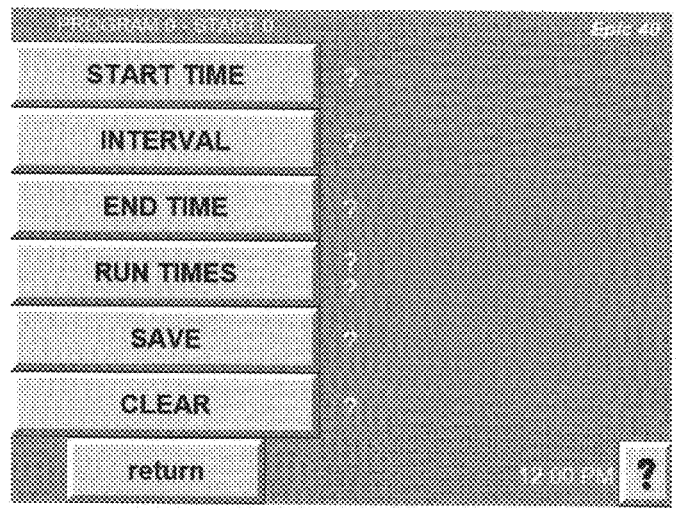
FIG. 26 shows an example monitor screen entitled: Independent Start Time Screen O.

The attributes of each start time as seen in FIG. 25 by "Start Time Screen P" are recorded for a quick reference. Pressing any of the "START TIME" buttons will activate "Independent Start Time Screen Q" as shown in FIG. 26. This screen allows definition of individual start times and includes buttons for "START TIME", "INTERVAL", "END TIME", "RUN TIMES", SAVE" and "CLEAR" as well as "RETURN", "?" (help) and the "TIME TAG".

Figure 27:
FIG. 27 shows an example monitor screen entitled: Time Input Screen R.

Pressing the "START TIME" button seen in "Independent Start Time Screen O" (FIG. 26) activates "Time Input Screen R" shown in FIG. 27.

Default times are AM. The user proceeds by entering the desired "START TIME" by sequentially pressing the appropriate buttons. If desired times are PM, press the PM button. For example, 3:15 PM is entered in a sequence of 3, 1, 5, PM. Pressing "DONE" will save the entry and return the user to "Independent Start Time Screen Q" shown in FIG. 26. Once set the selected start time will display to the right of the "START TIME" button.

Figure 28:
FIG. 28 shows an example monitor screen entitled: Interval Input Screen S.

The "INTERVAL" button in "Independent Start Time Screen O" (FIG. 26) defines the time from the initiation of one cycle to the initiation of the next cycle in a sequence. Pressing the "INTERVAL" button activates "Interval Input Screen S" as shown in FIG. 28.

The "INTERVAL" can be defined in minutes/seconds or hour/minutes. By touching the m:s button on "Interval Input Screen S" (FIG. 28), the input time is designated in minutes/seconds. Pressing "DONE" saves the entry and returns the user to the previous screen. If no "INTERVAL" is specified, system 100 will calculate the minimum interval as a default value.

A specified "END TIME" as selected from "Independent Start Time Screen O" (FIG. 26) is necessary if the operation is a repetitive process (defined below). If the process is defined as a specific number of cycles, the program will end when the last cycle is completed, thus no "END TIME" is required. If no "END TIME" is specified in a repetitive operation, the operation will continue until "END OF DAY".

Figure 29:
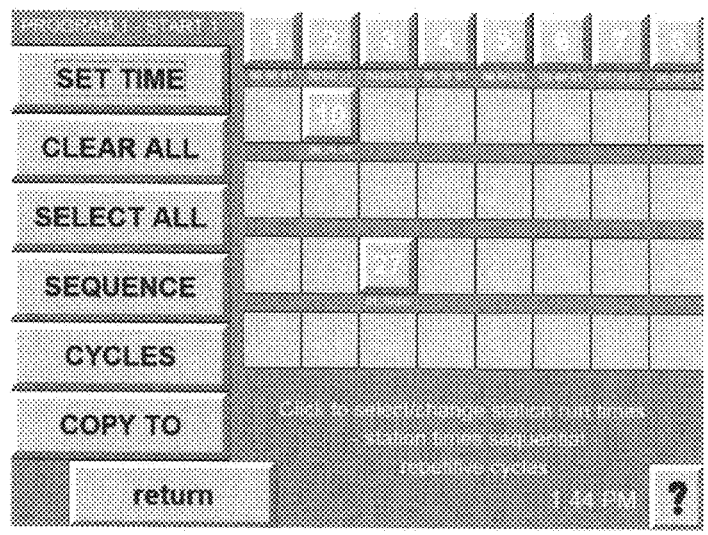
FIG. 29 shows an example monitor screen entitled: Run Time Screen T.

Pressing the "RUN TIMES" button activates "Run Time Screen T" shown in FIG. 29.

Any station 45 can be selected to be controlled by multiple programs and multiple start times. Each station 45 is selected by pressing the corresponding button. If a button is selected in error, pressing the button again will deselect it. All stations 45 can be assigned a common run time or each station 45 can be assigned an independent run time. By pressing the desired station buttons and then pressing the "SET TIME" button as seen on "Run Time Screen T" in FIG. 29. "Time Input Screen R" shown in FIG. 27 will again appear and the run time can be entered including the selection of hours/minutes and minutes/seconds. Pressing the "DONE" button saves the user entry and returns system 100 to "Run Time Screen T" (FIG. 29). A different station 45 or group of stations 45 can share a common start time but with different run times. By repeating the procedure above of selecting the desired station and pressing "RUN TIMES". Thus it is possible for each station 45 to start at the same time, yet have an independent run time.

The "SELECT ALL" button on "Run Time Screen T" as shown in FIG. 29 is a quick entry button that selects all stations whereas "CLEAR ALL" is a quick entry button that deselects all stations.

The "SEQUENCE" button allows stations 45 to be either operated in sequence or simultaneously. In the example shown in "Run Time Screen T" in FIG. 29, if stations #1 thru #8 are operated in sequence, as each station 45 completes the designated time, the next station 45 will be activated. If the simultaneous option is chosen, all eight (8) stations will operate at the same time. System default operates stations 45 in SEQUENTIAL MODE.

Figure 30:
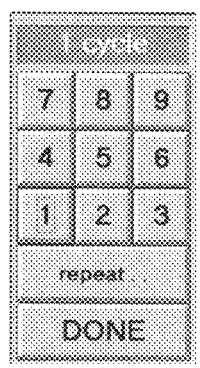
FIG. 30 shows an example monitor screen entitled: 1 Cycle Screen U.

Pressing the "CYCLES" button on "Run Time Screen T" (FIG. 29) activates "1 Cycle Screen U" as shown in FIG. 30.

The number of cycles can be any number up to nine, however, caution must be used such that the numbers of cycles can be performed in the given time as defined in the "START TIME" and "END TIME" options of "Independent Start Time Screen O" (FIG. 26). However, if a given cycle interval is to be repeated until the defined "STOP TIME", just press the "REPEAT" button on "1 Cycle Screen U" (FIG. 30). The defined cycle will be repeated beginning with the "START TIME" and ending at the specified "END TIME". System 100 default is 1 CYCLE. When entry is completed, pressing "DONE" saves the input and returns system 100 to "Run Time Screen T" (FIG. 29). The "COPY TO" button allows the data from this screen to be copied to another start time.

To save data press "RETURN" on "Run Time Screen T" (FIG. 29) which returns the user to the previous screen "Independent Start Time Screen O" and then press "SAVE" and answer the questions "YES".

Pressing the "RETURN" button twice returns the user back to "Start Time Screen P" (FIG. 25) discussed above and as each start time is programmed, the label "Start 1", "Start 2", etc. will appear in the color red. Immediately to the right of the "START" button is the programmed START TIME (5:00 AM shown in FIG. 25 on "Start Time Screen P"). To the right of the programmed time is the "SETTINGS" button. Pressing the "SETTINGS" button provides a record of the programmed attributes of this specific start time and activates the "Settings Report Screen V" shown in FIG. 31.

Figure 31:
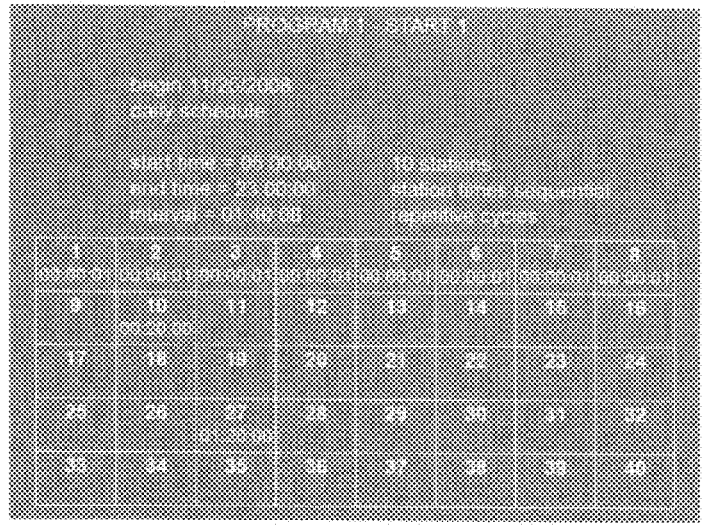
FIG. 31 shows an example monitor screen entitled: Settings Report Screen V.

"Settings Report Screen V" shown in FIG. 31 includes the following information:
1. Program number (top center of screen);
2. Start number (top center of screen);
3. Begin date (Nov. 25, 2008) (left side of screen);
4. Schedule (daily) (left side of screen);
5. Start time (05:00:00) (left side of screen);
6. End time (23:00:00) (left side of screen);
7. Interval (1:40:08) (left side of screen);
8. Number of stations controlled (10) (right side of screen);
9. Sequential operations (right side of screen);
10. Repetitive/Cycles (right side of screen); and
11. Designated stations with run times of each station (bottom of screen).

Pressing anywhere on "Settings Report Screen V" shown in FIG. 31 returns the user to the previous screen.

Figure 24:
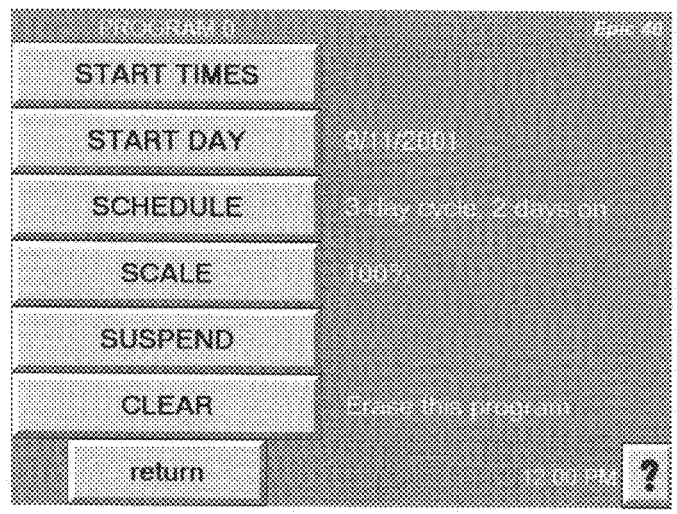
FIG. 24 shows an example monitor screen entitled: Program Definition Screen O.

Pressing the RETURN button (twice) returns the user to "Program Definition Screen O" shown in FIG. 24.

Figure 16:
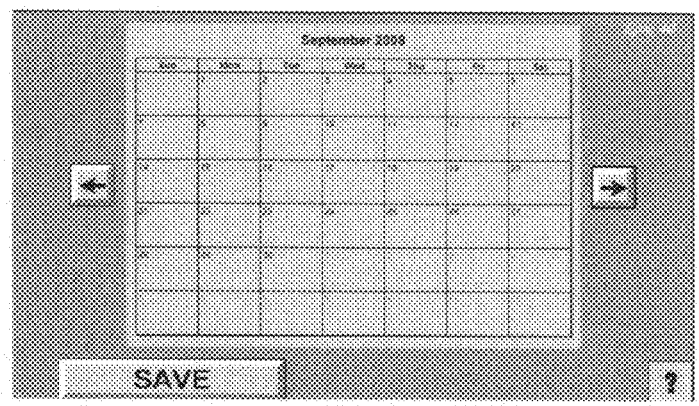
FIG. 16 shows an example monitor screen entitled: Set Date Screen G.

Pressing the "START DAY" button activates the calendar screen "Set Date Screen G" shown in FIG. 16. Press the date corresponding to today's date and the program is activated immediately. However, activation can be delayed to a future date by selecting the date activation as desired. This allows the user to program controller 10 for future applications. When the desired date occurs, the program will be activated. Pressing "SAVE" will return the user to the previous screen.

Figure 32:
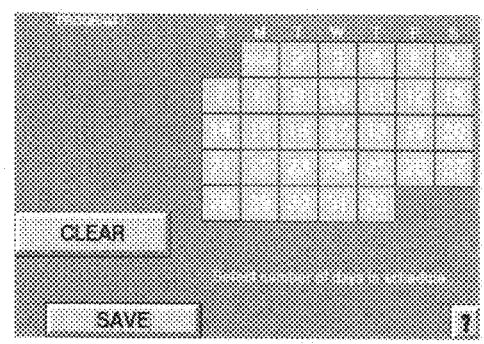
FIG. 32 shows an example monitor screen entitled: Schedule Screen W.

Pressing the "SCHEDULE" button activates "Schedule Screen W" shown in FIG. 32.

"Schedule Screen W" (FIG. 32) allows the user to designate the schedule of a particular program. A schedule can be any number of days up to thirty-two (32). As this schedule is complete, it is repeated until the program is deactivated. Thus, schedules are initiated by pressing the "NUMBER" corresponding to the number of days in the schedule (pressing "7" will initiate a weekly schedule). As the schedule is selected, the remaining buttons will be erased.

If the program is to run everyday, press the "TODAY" button on "Schedule Screen W" (FIG. 32). The remaining days will be erased. Press SAVE. This will implement the program and its specified attributes daily.

If the program is to run every other day, press "2" and select the active day. A weekly schedule is selected by pressing "7". After the number of days in the schedule is selected, the active days are selected by pressing the number corresponding to the days that are to be active, i.e. Monday, Wednesday, and Friday. Thus, the user can activate the program only on the desired days within the schedule. By pressing "SAVE" the user is returned to the previous screen. Run times of a program can be scaled and by pressing the "SCALE" button a numerical input screen is activated as shown by "Scaling % Screen X" in FIG. 33.

Figure 33:
FIG. 33 shows an example monitor screen entitled: Scaling % Screen X.

Entering "50" from "Scaling % Screen X" in FIG. 33 will reduce all watering times within the program to 50%. The scale factor can be any number between ten (10) and ninety-nine (99). Note: any programmed times less than one (1) minute will not be scaled. Press "DONE" to enter the desired scale factor into system 100. "RETURN" will return the user to the previous screen.

Figure 34:
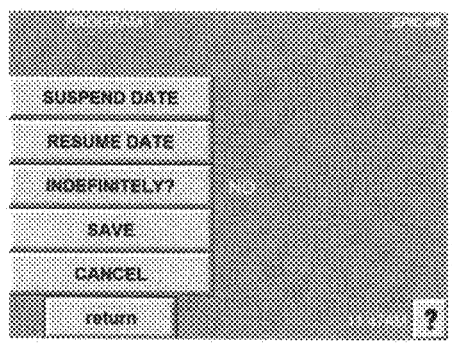
FIG. 34 shows an example monitor screen entitled: Suspend Program Screen Y.

The "SUSPEND" function of "Program Definition Screen O" (FIG. 24) allows suspension of the operation of the program. Thus programs can be suspended individually. Pressing the "SUSPEND" button will activate "Suspend Program Screen Y" shown in FIG. 34.

Pressing the "SUSPEND DATE" button of "Suspend Program Screen Y" (FIG. 34) will activate a calendar screen. Choose the date to suspend the program. This can be "today's date" or any date in the future. Pressing the "RESUME DATE" button of "Suspend Program Screen Y" (FIG. 34) will also activate a calendar screen. The user can then choose a date for controller 10 to resume the program.

If the resume date is not known, pressing the "INDEFINITELY" button of "Suspend Program Screen Y" (FIG. 34) will suspend the program until the suspension is canceled manually. Pressing the "CANCEL" button will cancel all previous commands. This can be done at any time, in the future it is desired to restore the program to active status. It is necessary to press SAVE to activate all commands as no action will be taken until "SAVE" is pressed.

Figure 35:
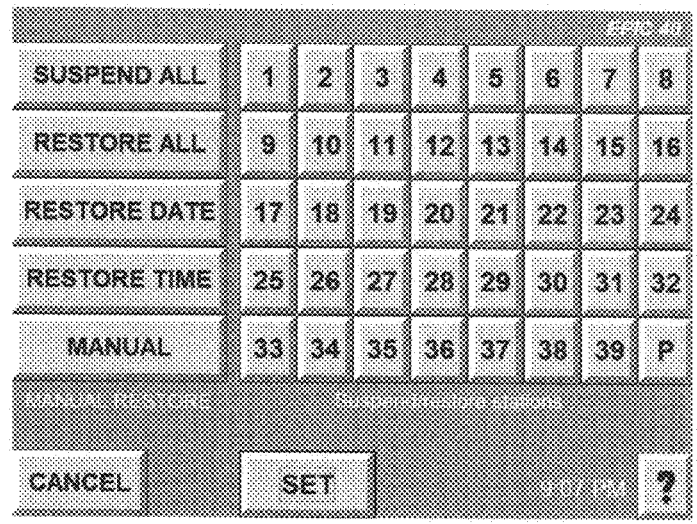
FIG. 35 shows an example monitor screen entitled: Suspend Screen Z.

Suspension of irrigation station(s) 45 is initiated from "System Screen A" (FIG. 10) by pressing the "STATIONS" button which activates "Suspend Screen Z" shown in FIG. 35.

"Suspend Screen Z" (FIG. 35) shows that all irrigation stations 45 are active. As a station(s) 45 is chosen to suspend, the button will go "flat". Then press the "SET" button and the selected station(s) 45 will be immediately suspended. At this point, no programs can activate the suspended irrigation station(s) 45.

Station(s) 45 that have been suspended can be restored to active status either on a selected day at a specific time, or immediately. If immediate restoration is desired, press the number of the station 45 to be restored and then press the "SET" button. The option to restore stations 45 to active services on a specific date is achieved by pressing the "RESTORE DATE" button which activates "Set Date Screen G" as seen in FIG. 16. Choose a date for the station 45 to be restored to active status. Pressing the "RESTORE TIME" button activates "Time Input Screen R" as seen in FIG. 27, allowing the user to specify a specific time on the specified date the station 45 will be restored to active status.

If at any time it is desired that controller 10 suspend all operations, the "SUSPEND ALL" button on "Suspend Screen Z" (FIG. 35) provides the ability to do this. Press the "SUSPEND ALL" button and the "SET" button to implement complete system 100 shutdown.

The "RESTORE ALL" button on "Suspend Screen Z" (FIG. 35) restores all suspended stations 45 to active status. Press "RESTORE ALL" then "SET" to restore all previously programmed activity.

After making the desired selection to either suspend or restore, pressing the "SET" button on "Suspend Screen Z" (FIG. 35) implements the desired actions immediately.

Manual operation of individual stations 45 (or groups of stations 45) can be programmed by pressing the "MANUAL" button on "System Screen A" shown in FIG. 10.

Figure 36:
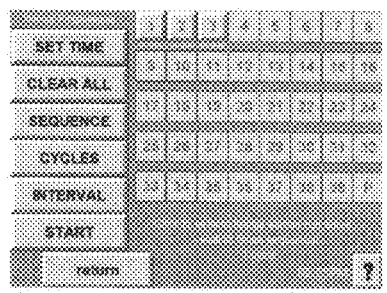
FIG. 36 shows an example monitor screen entitled: Manual Operations Screen AAA.

Pressing the "MANUAL" button will activate "Manual Operations Screen AAA" shown in FIG. 36.

Select any station(s) 45 to operate manually by pressing the corresponding station number on "Manual Operations Screen AAA" (FIG. 36). By pressing the "SET TIME" button "Time Input Screen R" (FIG. 27) will appear whereby the user can input the desired operation time and press "DONE". System default times are h:m. System default is for the selected stations 45 to operate in sequence, however by pressing the "SEQUENCE" button this will change to simultaneous operation. By pressing the "CYCLES" button and inputting the number of desired cycles the number of operation cycles is set. System default is one (1) cycle. If more than one (1) cycle is programmed the "INTERVAL" must be specified, otherwise the system default is the minimum interval.

Each station(s) 45 as shown schematically in FIGS. 2 and 8 can have independent attributes, i.e. different runtimes, sequence, cycles and intervals.

Pressing the "START" button on "Manual Operations Screen AAA" (FIG. 36) initiates the programmed actions. The "START" button will then become the "STOP" button. If at any time, it is desired to terminate the manual operation, the "STOP" button is pressed. All manual operations will cease and normal operations will resume.

The illustrations and examples provided herein are for explanatory purposes and are not intended to limit the scope of the appended claims as obvious variations thereon will become apparent to those skilled in the art.

I claim:

1. A method of irrigating comprising the steps of:
   a) providing a control system with a main circuit board having an input terminal, an output terminal, a central processor mounted on an auxiliary circuit board and connected to the main circuit board, a USB processor, the USB processor mounted on the main circuit board, the central processor having a USB output port, a touch screen monitor, the touch screen monitor connected to the USB output port, and an internal plug-in module, the internal plug-in module having an output microprocessor, and a water supply with an electric control valve connected to the output terminal;
   b) programming the central processor; and
   c) operating the electric control valve in accordance with the programmed central processor to irrigate in accordance therewith.

2. The method of claim 1 further comprising the steps of:
   a) presenting a plurality of irrigation programs;
   b) selecting a desired irrigation program; and
   c) implementing the selected irrigation program by contacting the touch screen monitor to program the central processor.

3. The method of claim 1 further comprising the step of removing the internal plug-in module and inserting a different internal plug-in module.

4. The method of claim 1 wherein programming the central processor comprises the step of connecting a programmed thumb drive to the central processor.

5. The method of claim 2 wherein operating the electric control valve of the water supply comprises the step of opening the electric control valve for a selected time period as defined by the selected irrigation program.

6. The method of claim 2 further comprising the step of contacting the touch screen monitor to manually start, stop or review the selected irrigation program.

* * * * *